(12) United States Patent
Muramatsu et al.

(10) Patent No.: US 10,048,416 B2
(45) Date of Patent: Aug. 14, 2018

(54) OPTICALLY ANISOTROPIC LAYER, METHOD OF MANUFACTURING THE SAME, LAMINATE, METHOD OF MANUFACTURING THE SAME, POLARIZING PLATE, LIQUID CRYSTAL DISPLAY DEVICE, AND ORGANIC EL DISPLAY DEVICE

(71) Applicant: FUJIFILM Corporation, Tokyo (JP)

(72) Inventors: Ayako Muramatsu, Kanagawa (JP); Shinnosuke Sakai, Kanagawa (JP); Teruki Niori, Kanagawa (JP); Shinichi Morishima, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 980 days.

(21) Appl. No.: 14/482,292

(22) Filed: Sep. 10, 2014

(65) Prior Publication Data

US 2015/0079380 A1    Mar. 19, 2015

(30) Foreign Application Priority Data

Sep. 11, 2013    (JP) .................................. 2013-188162
Mar. 31, 2014    (JP) .................................. 2014-072290
Jun. 2, 2014     (JP) .................................. 2014-114182

(51) Int. Cl.
*G02B 5/30*    (2006.01)
*C09K 19/38*   (2006.01)
(Continued)

(52) U.S. Cl.
CPC ............ *G02B 5/3016* (2013.01); *C09K 19/12* (2013.01); *C09K 19/2007* (2013.01);
(Continued)

(58) Field of Classification Search
None
See application file for complete search history.

(56) References Cited

U.S. PATENT DOCUMENTS

2002/0041352 A1* 4/2002 Kuzuhara ............ G02B 5/3083
                                                       349/117
2007/0286968 A1  12/2007 Takeuchi et al.

FOREIGN PATENT DOCUMENTS

JP    2006-215221 A    8/2006
JP    2006-259212 A    9/2006
(Continued)

OTHER PUBLICATIONS

Machine English Translation of JP_2011006360_A1 ; Okawa, H.; Compound, Optical Film; Jan. 13, 2011; JPO; whole document.*
Machine English translation of JP_2006293315_A1 ; Takeuchi, H.; Optically Anisotropic Film and LCD Device; Oct. 26, 2006; JPO; whole document.*
(Continued)

*Primary Examiner* — Tahseen N Khan
(74) *Attorney, Agent, or Firm* — Edwards Neils LLC; Jean C. Edwards, Esq.

(57) ABSTRACT

To suppress a phenomenon where an optical axis of the optically anisotropic layer is tilted when the optically anisotropic layer is produced by using a liquid crystalline compound showing smectic phase as a materials showing a higher level of orderliness. An optically anisotropic layer wherein a polymerizable composition, containing one or more polymerizable rod-like liquid crystal compound showing a smectic phase, is fixed in a state of smectic phase, and a direction of maximum refractive index of the optically anisotropic layer is inclined at 10° or smaller to the surface of the optically anisotropic layer, a method for manufacturing the same, a laminate and a method for manufacturing the same, a polarizing plate, a liquid crystal display device, and an organic EL display device.

33 Claims, 1 Drawing Sheet

Example 1 X-ray diffraction pattern

(51) Int. Cl.
*G02F 1/1337* (2006.01)
*C09K 19/12* (2006.01)
*C09K 19/20* (2006.01)
*C09K 19/30* (2006.01)
*C09K 19/34* (2006.01)
*C09K 19/24* (2006.01)
*C09K 19/32* (2006.01)
*C09K 19/04* (2006.01)

(52) U.S. Cl.
CPC .......... *C09K 19/2028* (2013.01); *C09K 19/24* (2013.01); *C09K 19/3068* (2013.01); *C09K 19/32* (2013.01); *C09K 19/322* (2013.01); *C09K 19/3447* (2013.01); *C09K 19/3486* (2013.01); *C09K 19/3491* (2013.01); *C09K 19/3497* (2013.01); *G02B 5/305* (2013.01); *G02B 5/3083* (2013.01); *C09K 2019/0448* (2013.01); *C09K 2019/2078* (2013.01); *C09K 2019/3077* (2013.01); *C09K 2019/3408* (2013.01); *C09K 2019/3416* (2013.01)

(56) References Cited

FOREIGN PATENT DOCUMENTS

| | | |
|---|---|---|
| JP | 2006293315 A1 * | 10/2006 |
| JP | 2008-019240 A | 1/2008 |
| JP | 2008-214269 A | 9/2008 |
| JP | 2008-241983 A | 10/2008 |
| JP | 2009-086260 A | 4/2009 |
| JP | 2011-006360 A | 1/2011 |
| JP | 2011006360 A1 * | 1/2011 |

OTHER PUBLICATIONS

Office Action, issued by the Japanese Patent Office (JPO) dated Jun. 6, 2017, in connection with corresponding Japanese Patent Application No. 2014-114182.

Office Action, issued by the Japanese Patent Office (JPO) dated Sep. 6, 2016, in connection with corresponding Japanese Patent Application No. 2014-114182.

Office Action, issued by the Japanese Patent Office (JPO) dated Mar. 6, 2018, in connection with corresponding Japanese Patent Application No. 2014-114182.

* cited by examiner

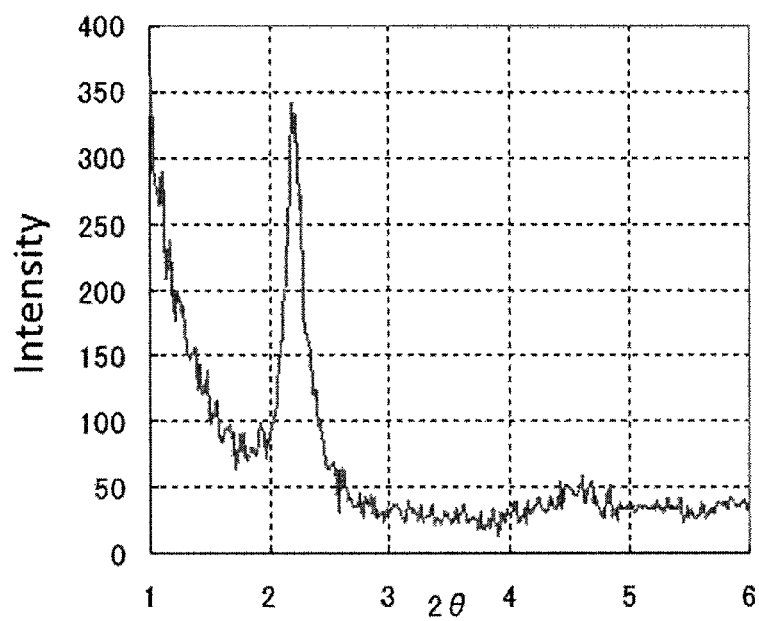
Example 1 X-ray diffraction pattern

OPTICALLY ANISOTROPIC LAYER, METHOD OF MANUFACTURING THE SAME, LAMINATE, METHOD OF MANUFACTURING THE SAME, POLARIZING PLATE, LIQUID CRYSTAL DISPLAY DEVICE, AND ORGANIC EL DISPLAY DEVICE

CROSS-REFERENCE TO RELATED APPLICATIONS

The present application claims priority under 35 U.S.C. § 119 to Japanese Patent Application No. 2013-188162, filed Sep. 11, 2013, Japanese Patent Application No. 2014-72290, filed Mar. 31, 2014 and Japanese Patent Application No. 2014-114182, filed Jun. 2, 2014. Each of the above applications are hereby expressly incorporated by reference, in its entirety, into the present application.

FIELD OF THE INVENTION

The present invention relates to an optically anisotropic layer wherein a polymerizable rod-like liquid crystal compound is fixed in a state of smectic phase, a method of manufacturing the same, a laminate, a method of manufacturing the same, a polarizing plate, a liquid crystal display device, and an organic EL display device.

BACKGROUND ART

Liquid crystal display device has been widely disseminated as a device for displaying image. By characteristic of its controllability of light based on retardation, the liquid crystal display device employs optical compensation based on retardation, for higher image quality. A general mode of embodiment of the optical compensation is such as using an optically anisotropic layer composed of a birefringent polymer film.

JP-A-2009-086260 describes a retardation film which comprises a transparent substrate composed of a cellulose derivative and an optically anisotropic layer which is formed on the transparent substrate, contains a rod-like compound having refractive index anisotropy, and satisfies $nx^1 > ny^1 \geq nz^1$, where $nx^1$ is refractive index in the direction x of in-plane slow axis, $ny^1$ is refractive index in the direction y of fast axis, and $nz^1$ is refractive index in the thickness direction z, and which has a bendability of 16 mm or smaller.

Many of the optically anisotropic layer are often configured by thermotropic liquid crystal, as a liquid crystal material for configuring it. However, the thermotropic material tends to be destabilized depending on environmental temperature. Therefore, the thermal stability is enhanced by introducing a polymerizable group into the liquid crystalline compound composing the liquid crystal material and fixing the state of alignment of the liquid crystalline compound by polymerization.

SUMMARY OF THE INVENTION

There has been a growing need of thinning and weight reduction for larger degree of freedom of design, typically pushed forward by dissemination of mobile terminals, so that the demand for thinning has also been directed to the optically anisotropic layer which is a part of the liquid crystal display device. The optically anisotropic layer is, however, required to develop a desired level of retardation, so that there has been a strong need for balancing the thinning and development of retardation. An optically anisotropic layer, which uses a liquid crystal material with a high developability (JP-A-2009-086260, for example) has been studied.

The developability of retardation by the liquid crystal material is affected not only by the developability of retardation by the liquid crystalline compound per se, but also by orderliness of alignment of the liquid crystalline compound. If the orderliness degrades, the optically anisotropic layer reduces its performance, due to disturbance in the alignment.

In pursuit of materials showing a higher level of orderliness, the present inventors investigated into manufacture of the optically anisotropic layer using a liquid crystalline compound which shows a smectic phase. The present inventors have found that, when the alignment of the liquid crystalline compound showing smectic phase was fixed, the optical axis of the resultant optically anisotropic layer is tilted (that is, pre-tilt angle increased), and that this made it difficult to obtain the optically anisotropic layer in an industrially stable manner.

The present invention was conceived to solve the problems described above. An object of the present invention is to provide an optically anisotropic layer wherein a liquid crystalline compound is fixed in a state of smectic phase, which shows good performances.

Means for solving the above-described problems are as follows:

[1] An optically anisotropic layer wherein a polymerizable composition, containing one or more polymerizable rod-like liquid crystal compound showing a smectic phase, is fixed in a state of smectic phase, and a direction of maximum refractive index of the optically anisotropic layer is inclined at 10° or smaller to the surface of the optically anisotropic layer.

[2] The optically anisotropic layer of [1], wherein the optically anisotropic layer has a thickness d of 1000 to 5000 nm, Re(550) of 10 to 400 nm, Re(550)/d of 0.01 to 0.1 where both of d and Re(550) are given in nm, and a contrast of 100,000 or larger and 200,000 or smaller.

[3] The optically anisotropic layer of [1], wherein a ratio of the polymerizable rod-like liquid crystal compound which remains unpolymerized is 5% by mass or less.

[4] The optically anisotropic layer of [1], wherein the polymerizable rod-like liquid crystal compound has a molecular weight of 1300 or smaller.

[5] The optically anisotropic layer of [1], wherein the polymerizable rod-like liquid crystal compound is a compound represented by the formula (I).

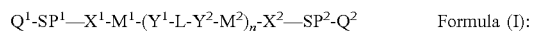
Formula (I):

where, n is an integer representing the number of repetition of which is 0 or more, each of $Q^1$ and $Q^2$ represents a polymerizable group, each of $SP^1$ and $SP^2$ represents a straight-chain or branched alkylene group, or a group composed of a combination of straight-chain or branched alkylene, with at least either of —O— and —C(=O)—, having 2 to 8 carbon atoms in total;

each of $X^1$ and $X^2$ represents a single bond or oxygen atom;

—$Y^1$-L-$Y^2$— represents a straight-chain alkylene group, or, a group composed of a combination of straight-chain alkylene group with —O— and/or —C(=O)—, having 3 to 18 carbon atoms in total;

$M^1$ is a group represented by

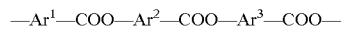

or $$-Ar^1-COO-Ar^2-COO-Ar^3-$$

or $$-Ar^1-COO-Ar^2-Ar^3-;$$

$M^2$ is a group represented by $$-Ar^3-OCO-Ar^2-OCO-Ar^1-OCO-$$

or $$-Ar^3-OCO-Ar^2-OCO-Ar^1-$$

or $$-Ar^3-OCO-Ar^2-Ar^1-;\text{ and}$$

each of $Ar^1$, $Ar^2$ and $Ar^3$ independently represents phenylene or biphenylene.

[6] The optically anisotropic layer of [5], wherein the polymerizable rod-like liquid crystal compound represented by the formula (1) satisfies at least any one of a to c below.
  a: At least either one of $Q^1$ and $Q^2$ represents a ring-opening polymerizable group.
  b: Each of $SP^1$ and $SP^2$ contains an alkylene oxide unit.
  c: n is 1 or larger.

[7] The optically anisotropic layer of [1], wherein the polymerizable rod-like liquid crystal compound is a compound represented by the formula (II);

$$L^1\text{-}G^1\text{-}D^1\text{-}Ar\text{-}D^2\text{-}G^2\text{-}L^2 \qquad \text{Formula (II):}$$

where,
Ar represents a divalent aromatic ring group represented by the formulae (II-1), (II-2), (II-3) or (II-4) below;
each of $D^1$ and $D^2$ independently represents —CO—O—, —O—CO—, —C(=S)O—, —O—C(=OS)—, —$CR_1R_2$—, —$CR_1R_2$—$CR_3R_4$—, —O—$CR_1R_2$—O—, —$CR_1R_2$—O—$CR_3R_4$—, —$CR_1R_2$—O—CO—, —O—CO—$CR_1R_2$—, —$CR_1R_2$—O—CO—$CR_3R_4$—, —$CR_1R_2$—CO—O—$CR_3R_4$—, —$NR_1$—$CR_2R_3$—, —$CR_1R_2$—$NR_3$—, —CO—$NR_2$—, or —$NR_1$—CO—;
each of $R_1$, $R_2$, $R_3$ and $R_4$ independently represents a hydrogen atom, halogen atom, or $C_{1-4}$ alkyl group;
each of $G^1$ and $G^2$ independently represents a $C_{5-8}$ divalent alicyclic hydrocarbon group, a methylene group contained in the alicyclic hydrocarbon group may be substituted by —O—, —S—, —NH— or —N(R)—;
each of $L^1$ and $L^2$ independently represents a monovalent organic group, and at least one selected from the group consisting of $L^1$ and $L^2$ represents a monovalent group having a polymerizable group.

(II-1)

(II-2)

(II-3)

(II-4)

in the formula (II-1) $Q_1$ represents —S—, —O— or —$NR^{11}$—, where $R^{11}$ represents a hydrogen atom or $C_{1-6}$ alkyl group;
$Y_1$ represents a $C_{6-12}$ aromatic hydrocarbon group, or, $C_{3-12}$ aromatic heterocyclic group;
each of $Z_1$ and $Z_2$ independently represents a hydrogen atom or $C_{1-20}$ aliphatic hydrocarbon group, $C_{3-20}$ alicyclic hydrocarbon group, monovalent $C_{6-20}$ aromatic hydrocarbon group, halogen atom, cyano group, nitro group, —$NR^{12}R^{13}$ or —$SR^{12}$, $Z_1$ and $Z_2$ may combine with each other to form an aromatic ring or aromatic heterocycle, each of $R^{12}$ and $R^{13}$ independently represents a hydrogen atom or $C_{1-6}$ alkyl group; in the formula (II-2), each of $A_1$ and $A_2$ independently represents a group selected from the group consisting of —O—, —NR—, —S— and —CO—, where R represents a hydrogen atom or substituent;
X represents a Group-XIV to XVI nonmetal atom, where, X may have a hydrogen atom or substituent bound thereto, and each of $Z_1$ and $Z_2$ independently represents a substituent;
in the formula (II-3) and the formula (II-4), Ax represents an $C_{2-30}$ organic group having at least one aromatic ring selected from the group consisting of aromatic hydrocarbon ring and aromatic heterocycle, Ay represents a hydrogen atom, a $C_{1-6}$ alkyl group which may have a substituent, or, a $C_{2-30}$ organic group having at least one aromatic ring selected from the group consisting of aromatic hydrocarbon ring and aromatic heterocycle; the aromatic ring contained in Ax and Ay may have a substituent; Ax and Ay may combine together to form a ring;

each of $Z_1$, $Z_2$ and $Z_3$ independently represents a hydrogen atom or substituent; and
$Q_2$ represents a hydrogen atom, or, $C_{1-6}$ alkyl group which may have a substituent.

[8] The optically anisotropic layer of [7], wherein a polymerizable composition, containing two or more polymerizable rod-like liquid crystal compounds represented by the formula (II), is fixed, and a transition temperature from the smectic phase to the nematic phase of the composition is 80° C. or lower.

[9] The optically anisotropic layer of [8], wherein a polymerizable composition, containing one or more polymerizable rod-like liquid crystal compound, is fixed in a state of nematic phase, and a direction of maximum refractive index of the optically anisotropic layer is inclined at 10° or smaller to the surface of the optically anisotropic layer.

[10] The optically anisotropic layer of [1], wherein the polymerizable composition further contains 1% by mass or more and 50% by mass or less of a polymerizable rod-like compound represented by the formula (2).

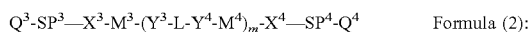

Formula (2):

where,
m is an integer representing the number of repetition of $(Y^3\text{-}L\text{-}Y^4\text{-}M^4)$ which is 0 or more,
each of $Q^3$ and $Q^4$ represents a polymerizable group,
$SP^3$ and $SP^4$ represent a same group which is a straight-chain or branched alkylene group, or, a group composed of a combination of a straight-chain or branched alkylene group, with —O— and/or —C(=O)—, having 2 to 8 carbon atoms in total;
$X^3$ and $X^4$ represent a same group which is a single bond or oxygen atom;
—$Y^3$-L-$Y^4$— represents a straight-chain alkylene group, or, a group composed of a combination of straight-chain alkylene group with —O— and/or —C(=O)—, having 3 to 18 carbon atoms in total; and
each of $M^3$ and $M^4$ represents a group composed of two or more aromatic rings, and —O— and/or —C(=O)—.

[11] The optically anisotropic layer of [10], wherein the polymerizable rod-like compound represented by the formula (2) satisfies at least any one of a to c below.
   a: at least either one of $Q^3$ and $Q^4$ represents a ring-opening polymerizable group.
   b: each of $SP^3$ and $SP^4$ contains an alkylene oxide unit.
   c: m is 1 or larger.

[12] The optically anisotropic layer of [11], wherein the polymerizable composition further contains a non-liquid crystalline multifunctional polymerizable compound.

[13] The optically anisotropic layer of [1], wherein the direction of maximum refractive index of the optically anisotropic layer is inclined at 0° or larger and 3° or smaller to the surface of the optically anisotropic layer.

[14] The optically anisotropic layer of [1], which is a uniaxial birefringence layer having the slow axis in the in-plane direction.

[15] The optically anisotropic layer of [14], wherein retardation values Re(450), Re(550) and Re(650) measured at 450 nm, 550 nm and 650 nm respectively satisfy the formulae (1) to (3).

$$100 \leq Re(550) \leq 180 \text{ nm} \quad \text{Formula (1)}$$

$$0.70 \leq Re(450)/Re(550) \leq 1.00 \quad \text{Formula (2)}$$

$$0.99 \leq Re(650)/Re(550) \leq 1.30 \quad \text{Formula (3)}$$

[16] A method of manufacturing the optically anisotropic layer of [1], which comprises steps of heating a layer which is provided on a support and is composed of a polymerizable composition which contains a polymerizable rod-like liquid crystal compound, up to or above the phase transition temperature between the smectic liquid crystal phase and the nematic liquid crystal phase, and cooling the layer to a temperature 5° C. or more lower than the phase transition temperature, followed by polymerization.

[17] A laminate comprising the optically anisotropic layer of [1].

[18] The laminate of [17], wherein the optically anisotropic layer of [1] is formed on the surface of a photo-aligned film.

[19] The laminate of [18] which further comprises a linear polarizer, wherein the photo-aligned film is provided over the surface of the linear polarizer.

[20] The laminate of [17], wherein the optically anisotropic layer of [1] is formed on the surface of a rubbed alignment film.

[21] The laminate of [20], wherein the polymerizable rod-like liquid crystal compound has a longitudinal molecular axis orthogonal to the direction of rubbing of the rubbed alignment film.

[22] The laminate of [20] which further comprises a linear polarizer, wherein the rubbed alignment film is provided on the surface of the linear polarizer.

[23] The laminate of [17], wherein a uniaxial birefringence layer having a refractive index in the thickness direction larger than the refractive index in the in-plane direction is formed on the surface of the optically anisotropic layer of [1].

[24] The laminate of [23], wherein the birefringence layer has a retardation Rth(550) measured at 550 nm in the thickness direction which satisfies the formula (11).

$$-150 \leq Rth(550) \leq -10 \quad \text{Formula (11)}$$

[25] The laminate of [24], wherein Rth(450), Rth(550) and Rth(650) satisfy the formulae (1) and (2).

$$0.70 \leq Rth(450)/Rth(550) \leq 1.00 \quad \text{Formula (1)}$$

$$0.99 \leq Rth(650)/Rth(550) \leq 1.30 \quad \text{Formula (2)}$$

[26] A method of manufacturing the laminate of [23], which comprises:
step A of coating a photo-alignable material on a support to manufacture a photo-aligned film;
step B of vertically or obliquely irradiating polarized light to the photo-aligned film, as process B;
step C of coating a polymerizable composition which contains a polymerizable rod-like liquid crystal compound on the photo-aligned film after steps A and B; and
step D of heating the polymerizable composition up to or above a phase transition temperature between a smectic liquid crystal phase and a nematic liquid crystal phase, and cooling the composition to a temperature 5° C. or more lower than the phase transition temperature, followed by polymerization.

[27] A method of manufacturing the laminate of [23], which comprises:
step A of coating a photo-alignable material on a support to manufacture a photo-aligned film;
step B of obliquely irradiating non-polarized light to the photo-aligned film, as process B;
step C of coating a polymerizable composition which contains a polymerizable rod-like liquid crystal compound on the photo-aligned film after steps A and B; and step D of heating the polymerizable composition up to or above a phase transition temperature between a smectic liquid crystal phase and a nematic liquid crystal phase, and cooling the composition to a temperature 5° C. or more lower than the phase transition temperature, followed by polymerization.

[28] A polarizing plate comprising the optically anisotropic layer of [1].

[29] The polarizing plate of [28], wherein the slow axis of the optically anisotropic layer and the absorption axis of the linear polarizer form an angle of 45° to 90°.

[30] A liquid crystal display device comprising the optically anisotropic layer of [1].

[31] The liquid crystal display device of [30], which is an IPS-mode device.

[32] The liquid crystal display device of [31], which is an IPS-mode device using a photo-alignment.

[33] The liquid crystal display device of [32], wherein the rod-like liquid crystal used in a liquid crystal cell is aligned at an angle of 1° or smaller to the plane of the optically anisotropic layer.

[34] An organic EL display device comprising the optically anisotropic layer of [1].

Advantageous Effects of Invention

The present invention successfully provides an optically anisotropic layer wherein a liquid crystalline compound is fixed in a state of smectic phase and an angle between the direction of maximum refractive index and the plane of layer is controlled, which shows good performance and can be manufactured in a stable manner.

BRIEF DESCRIPTION OF THE DRAWINGS

FIG. 1 shows an X-ray diffractometric chart illustrating a result of X-ray diffractometry of an optically anisotropic layer manufactured in Example 1.

DETAILED DESCRIPTION OF THE INVENTION

The present invention will be explained in detail below. The description of essential features below may be sometimes based on representative embodiments of the present invention, but the present invention is not limited to such embodiments. Note that, in this specification, all numerical ranges given in the form of "to" preceded and followed by numerals means numerical ranges limited by these numerals as the lower limit value and the upper limit value, respectively. When stating about angle, "normal", "orthogonal" and "parallel" are used to describe the range of (precise angle)±10°, and the terminologies of "same" and "different" are used depending on whether the difference is smaller than 5° or not.

In the present invention, "tilt angle" means the angle formed between a tilted liquid crystal and a plane of layer, and more specifically means the maximum angle among angles formed between the direction of maximum refractive index and the plane of layer in an index ellipsoid of the liquid crystalline compound. Accordingly, for the rod-like liquid crystalline compound having a positive optical anisotropy, the tilt angle means an angle formed between the longitudinal direction of the rod-like liquid crystalline compound, or the direction of director, and the plane of layer. In the present invention, "average tilt angle" means the average value of the tilt angle ranging between the upper interface and the lower interface of the optically anisotropic layer. The tilt angle (that is, tilt of the direction of the maximum refractive index of the optically anisotropic film, to the surface of the optically anisotropic film) may be measured using an automatic birefringence meter (for example, KOBRA-21ADH, from Oji Scientific Co., Ltd.).

In the present invention, the film contrast was determined by (the maximum luminance in the parallel Nicols state)/(the minimum luminance in the crossed Nicols state). A direct-type fluorescent tube backlight light source, the upper side of polarizing plate, a sample, the underside of polarizing plate are, in the order from the bottom, placed on a table such that each of the surfaces is level. At this time, the sample and upper side of polarizing plate are set to be rotatable. Light that is emitted from the light source and passed through the upper side of polarizing plate, sample, and underside of polarizing plate in the order mentioned is measured from the vertical direction using BM-5A (manufactured by TOPCON) to determine luminance. In the measurement, the upper side of polarizing plate is first rotated without the sample to set a position at which the luminance is darkest (crossed Nicols state). The sample is inserted and rotated under crossed Nicols to measure the lowest luminance. Next, two polarizing plates of the upper side of polarizing plate and the underside of polarizing plate are disposed in a parallel Nicols state and the sample is rotated to measure the highest luminance.

The film contrast is defined by the value calculated from the below formula in order to remove the contribution of brightness leakage due to the upper side polarizing plate and the underside polarizing plate.

Contrast=1/((the minimum luminance in the crossed Nicols state at the time of installation of the film)/(the maximum luminance in the parallel Nicols state at the time of installation of the film)−(the minimum luminance in the crossed Nicols state in the absence of the sample)/(the maximum luminance in the parallel Nicols state in the absence of the sample))

As used herein, symbol Re(λ) refers to the retardation in a plane at a wavelength λ (nm), and symbol Rth (λ) refers to the retardation across the thickness at a wavelength λ (nm). Re(λ) is measured by irradiating a film with light having a wavelength λ (nm) in the normal direction with a KOBRA 21ADH or KOBRA WR birefringence analyzer (from Oji Scientific Instruments). If the film for measurement has a uniaxial or biaxial optical indicatrix, Rth(λ) is calculated through the following procedure.

When a film to be analyzed is expressed by a uniaxial or biaxial index ellipsoid, Rth(λ) of the film is calculated as follows. Rth(λ) is calculated by KOBRA 21ADH or WR on the basis of the six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH or WR, as an inclination axis (a rotation axis; defined in an arbitrary in-plane direction if the film has no slow axis in plane), a value of hypothetical mean refractive index, and a value entered as a thickness value of the film.

In the above, when the film to be analyzed has a direction in which the retardation value is zero at a certain inclination angle, around the in-plane slow axis from the normal direction as the rotation axis, then the retardation value at the inclination angle larger than the inclination angle to give a zero retardation is changed to negative data, and then the Rth(λ) of the film is calculated by KOBRA 21ADH or WR.

Around the slow axis as the inclination angle (rotation angle) of the film (when the film does not have a slow axis, then its rotation axis may be in any in-plane direction of the film), the retardation values are measured in any desired inclined two directions, and based on the data, and the estimated value of the mean refractive index and the inputted film thickness value, Rth may be calculated according to formulae (7) and (8):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{-\sin(-\theta)}{nx}\right)\right)\right\}^2}} \right] \times \frac{d}{\cos\left\{\sin^{-1}\left(\frac{\sin(-\theta)}{nx}\right)\right\}}$$ Formula (7)

$$Rth = \left(\frac{nx+ny}{2} - nz\right) \times d.$$ Formula (8)

Re(θ) represents a retardation value in the direction inclined by an angle θ from the normal direction; nx represents a refractive index in the in-plane slow axis direction; ny represents a refractive index in the in-plane direction orthogonal to nx; and nz represents a refractive index in the direction orthogonal to nx and ny. And "d" is a thickness of the film.

When the film to be analyzed is not expressed by a monoaxial or biaxial index ellipsoid, or that is, when the film does not have an optical axis, then Rth(λ) of the film may be calculated as follows:

Rth(λ) of the film is measured around the slow axis (judged by KOBRA 21ADH or WR) as the in-plane inclination axis (rotation axis), relative to the normal direction of the film from −50 degrees up to +50 degrees at intervals of 10 degrees, in 11 points in all with a light having a wavelength of λ nm applied in the inclined direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some main retardation films are listed below:

cellulose acylate (1.48), cycloolefin polymer (1.52), polycarbonate (1.59), polymethylmethacrylate (1.49) and polystyrene (1.59).

The instrument KOBRA-21ADH or KOBRA-WR calculates nx, ny, and nz, through input of the assumed average refractive index and the film thickness, and then calculates Nz=(nx−nz)/(nx−ny) on the basis of the calculated nx, ny, and nz.

In the conventional liquid crystal display device, rubbed substrate has often been used to align liquid crystal. However, due to difficulty of rubbing at around spacers in a liquid crystal cell, it has been difficult to appropriately align there the liquid crystal, with a larger risk of causing leakage of light. Now, photo-aligning has been known as a method of aligning the liquid crystal without using the rubbed substrate. The photo-aligning can align the liquid crystal by non-contact exposure of polarized light, and can therefore align the liquid crystal also at around the spacers. As a consequence, the liquid crystal display device will be reduced in the risk of leakage of light and will be improved in contrast. In particular, the photo-aligning is successfully used for the IPS-mode device intrinsically in no need of pre-tilt angle. The present inventors found out that, for the IPS-mode device using the photo-aligning, since the pre-tilt angle of the liquid crystal in the liquid crystal cell is nearly 0°, so that also the optically anisotropic layer, which composes the retardation film used for this type of display device, preferably has a small pre-tilt angle, especially 0°. This is supposedly because, if the pre-tilt angle of the optically anisotropic layer increases, an optical asymmetry would be induced, and this adversely increases viewing angle dependence of hue changes in oblique view.

[Optically Anisotropic Layer]

The present invention relates to an optically anisotropic layer wherein a polymerizable rod-like liquid crystal compound is fixed in a state of smectic phase, or an optically anisotropic layer wherein a polymerizable rod-like liquid crystal compound capable of showing a smectic phase and a nematic phase is fixed in a state of development of nematic phase. The optically anisotropic layer of the present invention may be provided in the form of membrane or film, that is, optically anisotropic membrane or optically anisotropic film, which may be provided in the form of single layered product, or in the form of laminate with any other layer.

In the optically anisotropic layer, molecules of the liquid crystalline compound are fixed in a state of smectic phase or nematic phase of homogeneous alignment (horizontal alignment) or near-horizontal inclined alignment where the liquid crystalline compound has a tilt angle of 10° or smaller.

In this specification, the smectic phase refers to a state in which unidirectionally aligned molecules form a laminar structure.

In this specification, the nematic phase refers to a state in which the constituent molecules show an ordered alignment, but are not ordered in position in a three-dimensional manner.

The smectic phase is configured by continuation of primary structures, in each of which the liquid crystalline compound molecules are aligned according to a high degree of regularity.

Fluidity of the liquid crystalline compound molecules within the layer is attributable to weakness of interaction of liquid crystalline compound molecules between the layers. On the other hand, the layer of the liquid crystalline compound molecules is rigid by virtue of the high level of regularity of the liquid crystalline compound molecules. The present inventors found out that, in the process of forming the optically anisotropic layer by the layers of the liquid crystalline compound molecules, if the liquid crystalline compound molecules come into close proximity, particularly due to polymerization shrinkage in the process of polymerization of the liquid crystalline compound molecules, the liquid crystalline compound molecules incline largely, trying to reduce influence of the inter-layer interaction of the layers of the liquid crystalline compound molecules, while keeping the regularity among the liquid crystalline compound molecules within the layer. When the layers are fixed in such inclined state, angle formed between the direction of maximum refractive index and the plane of layer unfortunately increases.

According to the present invention, by reducing the inter-layer interaction of the liquid crystalline compound molecules, the liquid crystalline compound molecules are fixed in a state of smectic phase according to homogeneous alignment (horizontal alignment) or according to near-horizontal inclined alignment (referred to as (near-) horizontal alignment", hereinafter). Thus an optically anisotropic layer having an angle between the direction of maximum refractive index and the plane of layer of 10° or smaller, preferably 3° or smaller, and particularly 1° or smaller, is obtained. The lower limit of the angle between the direction of maximum refractive index and the plane of layer is 0° or larger, without special limitation.

The optically anisotropic layer of the present invention may be manufactured by fixing a smectic liquid crystal. When the smectic liquid crystal is used, first, the smectic liquid crystal is allowed to align (near-)horizontally, and then fixed by polymerization, photo-crosslinking, or heat-crosslinking.

Since the smectic liquid crystal causes only a small depolarization by scattering of the optically anisotropic layer due to fluctuation in alignment, so that it may be more preferably used for applications where a relatively large retardation of 100 nm or above is required. The smectic phase may be selectable from SmA, SmB, SmC, or phases of higher orders, without special limitation.

Whether the liquid crystalline compound is fixed in a state of smectic phase or not may be confirmed by observing the X-ray diffraction pattern. If fixed in a state of the smectic phase, an X-ray diffraction pattern attributable to orderliness of the layers will be observed, based on which the state of fixation may be determined. In the optically anisotropic layer of the present invention, a smectic liquid crystal may be fixed in a state of nematic phase. Whether the liquid crystalline compound is fixed in a state of nematic phase or not is confirmed by observing X-ray diffraction pattern. If fixed in a state of nematic phase, only a broad halo pattern is observed in the high angle region, without a sharp peak in the low angle side which is derived from layer formation. The state of fixation may be determined in this way.

While the thickness d of the optically anisotropic layer of the present invention may vary depending on the material to be used or target value of retardation, only a small thickness will suffice to achieve a sufficient level of performance, since the polymerizable rod-like liquid crystal compound has a large birefringence. The thickness d is therefore preferably 100 nm to 5000 nm, more preferably 1000 to 5000 nm, and from another point of view, also preferably 200 nm to 3000 nm, and more preferably 300 nm to 2000 nm.

In-plane retardation Re(550) of the optically anisotropic layer measured at 550 nm is preferably 10 to 400 nm, and more preferably 20 to 375 nm, although the preferable range may vary depending on applications.

For an exemplary case where a λ/4 plate, typically used for circular polarizing plate, is configured, in order to make the optically anisotropic layer serve as a retardation region with a retardation of λ/4 or around, Re(550) is preferably 10 to 200 nm, more preferably 20 to 165 nm, furthermore preferably 20 to 155 nm, and from another point of view, also preferably 110 to 165 nm, further preferably 115 to 150 nm, and particularly 120 to 145 nm.

While Rth (550) is not specifically limited, considering that the optically anisotropic layer is used as an A-plate, the Nz coefficient given by (Rth/Re)+0.5 preferably falls in the range from 0.8 to 1.2, and is most preferably 1.0.

For an exemplary case where a λ/2 plate is configured, in order to make the optically anisotropic layer serve as a retardation region with a retardation of λ/2 or around, Re(550) is preferably 200 to 400 nm, and more preferably 200 to 375 nm, and furthermore preferably 220 to 325 nm, and particularly 250 to 300 nm.

While Rth(550) is not specifically limited, considering that the optically anisotropic layer is used as an A-plate, the Nz coefficient given by (Rth/Re)+0.5 preferably falls in the range from 0.8 to 1.2, and is most preferably 1.0.

Re(550)/d is preferably 0.01 to 0.2, more preferably 0.01 to 0.1, furthermore preferably 0.02 to 0.06, and particularly 0.03 to 0.06.

The higher the contrast, the better the display quality. However, since the contrast is reversely proportional to Re(550)/d, the contrast is preferably 40,000 to 1,200,000, more preferably 50,000 to 200,000, and furthermore preferably 100,000 to 200,000.

For the case where it is used as a laminate in combination with a positive C-plate, Re(550) preferably satisfies, for example, 100 nm≤Re(550)≤180 nm, more preferably satisfies 100 nm≤Re(550)≤150 nm, and furthermore preferably satisfies 120 nm≤Re(550)≤140 nm, although the optimum value may vary depending on physical properties of the C-plate to be combined. Also the thickness retardation Rth(550) of the optically anisotropic layer, measured at 550 nm, preferably satisfies 30 nm≤Rth(550)≤100 nm, more preferably satisfies 40 nm≤Rth(550)≤90 nm, and furthermore preferably satisfies 50 nm≤Rth(550)≤80 nm, although the preferably range may vary depending on applications.

[Polymerizable Rod-Like Liquid Crystal Compound Used for Manufacturing Optically Anisotropic Layer]

The polymerizable rod-like liquid crystal compound showing smectic phase, used in the present invention, has at least a rigid moiety called "mesogen group", and a polymerizable group.

The polymerizable rod-like liquid crystal compound becomes less soluble into organic solvent for industrial use, such as MEK, when the molecular weight thereof increases, so that it may become difficult to obtain a desired coated film by solvent coating, the manufacturability may degrade, and also the film quality, such as surface texture, of the resultant optically anisotropic layer may degrade. Therefore, the polymerizable rod-like liquid crystal compound showing smectic phase preferably has a molecular weight of 1300 or smaller.

The polymerizable rod-like liquid crystal compound is particularly preferably a compound represented by the formula (I) below.

$$Q^1\text{-}SP^1\text{—}X^1\text{-}M^1\text{-}(Y^1\text{-}L\text{-}Y^2\text{-}M^2)_n\text{-}X^2\text{—}SP^2\text{-}Q^2 \quad \text{Formula (I):}$$

where,
n is an integer representing the number of repetition of $M^2$) which is 0 or more,
each of $Q^1$ and $Q^2$ represents a polymerizable group,
each of $SP^1$ and $SP^2$ represents a straight-chain or branched alkylene group, or a group composed of a combination of straight-chain or branched alkylene, with at least either of —O— and —C(=O)—, having 2 to 8 carbon atoms in total;
each of $X^1$ and $X^2$ represents a single bond or oxygen atom;

—Y¹-L-Y²— represents a straight-chain alkylene group, or, a group composed of a combination of straight-chain alkylene group with —O— and/or —C(=O)—, having 3 to 18 carbon atoms in total;

$M^1$ is a group represented by

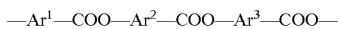
—Ar¹—COO—Ar²—COO—Ar³—COO— or

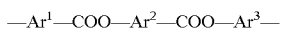
—Ar¹—COO—Ar²—COO—Ar³— or

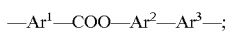
—Ar¹—COO—Ar²—Ar³—;

$M^2$ is a group represented by

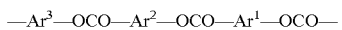
—Ar³—OCO—Ar²—OCO—Ar¹—OCO— or

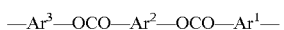
—Ar³—OCO—Ar²—OCO—Ar¹— or

—Ar³—OCO—Ar²—Ar¹—; and each of $Ar^1$, $Ar^2$ and $Ar^a$ independently represents phenylene or biphenylene, substituted by an arbitrary number of bromine atom, methyl group, or methoxy group.

Each of the polymerizable groups $Q^1$ and $Q^2$ is preferably a radical-polymerizable group (for example, ethylenic unsaturated group) or ring-opening polymerizable group (for example, epoxy group, oxetane group). The ring-opening polymerizable group is particularly preferable, since it causes only a small polymerization shrinkage, and can therefore suppress the layers from coming excessively close to each other.

Each of $SP^1$ and $SP^2$ is called "spacer group", which connects a polymerizable group and a mesogen group.

The spacer group is preferably a $C_{2-12}$ alkylene group or alkylene oxide. Alkylene oxide is more preferable.

The alkylene oxide is preferably ethylene oxide. Two or three ethylene oxide units are preferably contained, since the liquid crystal phase is controllable over wider temperature range.

Each of $X^1$ and $X^2$ represents a linking group, and is selected from single bond and oxygen atom.

n represent an integer of 0 or larger. Increase in n means a production of a liquid crystal molecule having already-polymerized mesogen group, so that polymerization shrinkage in the process of forming the optically anisotropic layer may be reduced.

Note however that the smectic liquid crystal has a large inter-molecular interaction, so that increase in n results in elevation of the viscosity, and the alignment will need higher temperature and longer time. Accordingly, n is preferably 0 to 3, more preferably 0 to 2, and particularly 0 to 1.

Each of $Ar^1$, $Ar^2$ and $Ar^3$ independently represents phenylene or biphenylene, substituted by an arbitrary number of bromine atom, methyl group, or methoxy group. The total number of benzene rings contained in $Ar^1$, $Ar^2$ and $Ar^3$ is preferably 3 to 6, more preferably 3 to 5, and particularly 3 to 4.

Specific examples of the polymerizable rod-like liquid crystal compound represented by the formula (1) will be shown below, without limiting the present invention.

TABLE 1

| Number of compound | SP | L | R |
|---|---|---|---|
| (I-1) | —(CH₂)₄— | —(CH₂)₃— | H |
| (I-2) | —(CH₂)₄— | —(CH₂)₃— | Br |
| (I-3) | —(CH₂)₄— | —(CH₂)₃— | OCH₃ |
| (I-4) | —CH₂CH(CH₃)CH₂— | —(CH₂)₃— | H |
| (I-5) | —(CH₂CH₂O)₂CH₂CH₂— | —(CH₂)₄— | H |
| (I-6) | —(CH₂CH₂O)₂CH₂CH₂— | —(CH₂CH₂O)₂CH₂CH₂— | H |

(I-7)

TABLE 1-continued
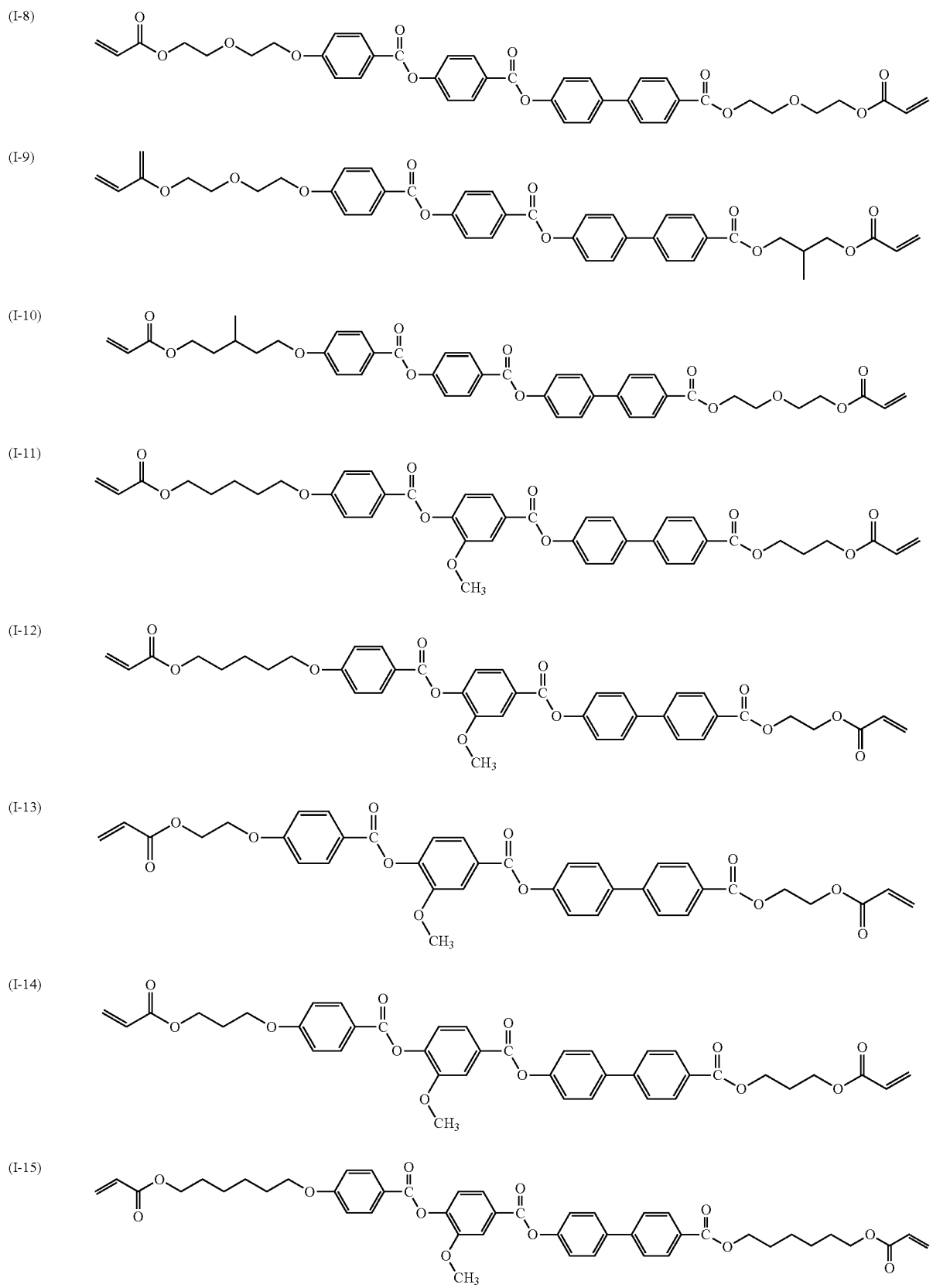

The compounds represented by the formulae (I) can be synthesized by a combination of known synthesis reactions. Specifically, these compounds can be synthesized by methods disclosed in various documents (for example, Methoden der Organischen Chemie (Houben-Weyl), Some specific methods (Thieme Verlag, Stuttgart); Experimental Chemistry (Jikken Kagaku Koza); and New Experimental Chemistry (Shin Jikken Kagaku Koza)). Also available are the synthesis methods disclosed in the specifications of U.S. Pat. Nos. 4,683,327, 4,983,479, 5,622,648, and 5,770,107, International Publication Nos. WO 95/22586, WO 97/00600, and WO 98/47979, and British Patent No. 2,297,549.

It is particularly preferable that the polymerizable rod-like liquid crystal compound is a compound represented by the formula (II) below.

$$L^1\text{-}G^1\text{-}D^1\text{-}Ar\text{-}D^2\text{-}G^2\text{-}L^2 \qquad \text{Formula (II):}$$

where, each of $D^1$ and $D^2$ independently represents —CO—O—, —O—CO—, —C(=S)O—, —O—C(=OS)—, —$CR^1R^2$—, —$CR^1R^2$—$CR^3R^4$—, —O—$CR^1R^2$—O—, —$CR^1R^2$—O—$CR^3R^4$—, —$CR^1R^2$—O—CO—, —O—CO—$CR^1R^2$—, —$CR^1R^2$—O—CO—$CR^3R^4$—, —$CR^1R^2$—CO—O—$CR^3R^4$—, $NR^1$—$CR^2R^3$—, —$CR^1R^2$—$NR^3$—, —CO—$NR^1$—, or —$NR^1$—CO—;

each of $R^1$, $R^2$, $R^3$ and $R^4$ independently represents a hydrogen atom, halogen atom, or $C_{1-4}$ alkyl group;

each of $G^1$ and $G^2$ independently represents a $C_{5-8}$ divalent alicyclic hydrocarbon group, a methylene group contained in the alicyclic hydrocarbon group may be substituted by —O—, —S—, —NH— or —NH—;

each of $L^1$ and $L^2$ independently represents a monovalent organic group, and at least one selected from the group consisting of $L^1$ and $L^2$ represents a monovalent group having a polymerizable group, Ar represents a divalent aromatic ring group represented by the formulae (II-1), (II-2), (II-3) or (II-4) below;

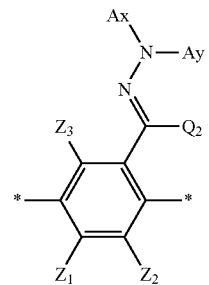
(II-1)

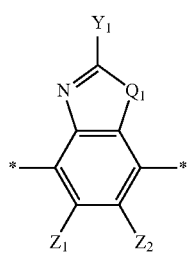
(II-2)

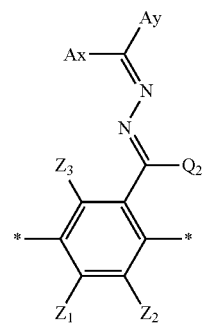
(II-3)

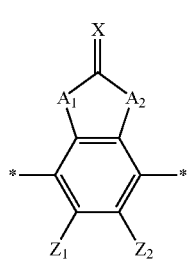
(II-4)

In the formulae (II-1) to (II-4), $Q_1$ represents —S—, —O— or —$NR^{11}$—, where $R^{11}$ represents a hydrogen atom or $C_{1-6}$ alkyl group;

$Y_1$ represents a $C_{6-12}$ aromatic hydrocarbon group, or, $C_{3-12}$ aromatic heterocyclic group.

Each of $Z_1$, $Z_2$ and $Z_3$ independently represents a hydrogen atom or $C_{1-20}$ aliphatic hydrocarbon group, $C_{3-20}$ alicyclic hydrocarbon group, monovalent $C_{6-20}$ aromatic hydrocarbon group, halogen atom, cyano group, nitro group, —$NR^{12}R^{13}$ or —$SR^{12}$, $Z_1$ and $Z_2$ may combine with each other to form an aromatic ring or aromatic heterocycle, each of $R^{12}$ and $R^{13}$ independently represents a hydrogen atom or $C_{1-8}$ alkyl group, each of $A_1$ and $A_2$ independently represents a group selected from the group consisting of —O—, —$NR^{21}$— ($R^{21}$ represents a hydrogen atom or substituent), —S— and CO—, X represents a Groups XIV to XVI nonmetal atom to which a hydrogen atom or substituent may be bound, Ax represents an $C_{2-30}$ organic group having at least one aromatic ring selected from the group consisting of aromatic hydrocarbon ring and aromatic heterocycle, Ay represents a hydrogen atom, $C_{1-6}$ alkyl group which may have a substituent, or, a $C_{2-30}$ organic group having at least one aromatic ring selected from the group consisting of aromatic hydrocarbon ring and aromatic heterocycle. The aromatic ring contained in Ax and Ay may have a substituent. Ax and Ay may combine together to form a ring;

$Q_2$ represents a hydrogen atom, or, $C_{1-6}$ alkyl group which may have a substituent.

As for definitions and preferable ranges of the individual substituents represented by the formula (II), $D^1$, $D^2$, $G^1$, $G^2$, $L^1$, $L^2$, $R^1$, $R^2$, $R^3$, $R^4$, $X^1$, $Y^1$, $Z_1$ and $Z_2$ may be referred respectively to the description on $D^1$, $D^2$, $G^1$, $G^2$, $L^1$, $L^2$, $R^1$, $R^2$, $R^3$, $R^4$, $X^1$, $Y^1$, $Q^1$ and $Q^2$ of Compound (A) in JP-A-2012-21068; $A_1$, $A_2$ and X may be referred to the description on $A_1$, $A_2$ and X of the compound represented by the formula (I) in JP-A-2008-107767; and Ax, Ay and $Q_2$ may be referred to the description on Ax, Ay and $Q^1$ of the compound represented by the formula (I) in WO2013/

018526. $Z_3$ may be referred to the description on. $Q^1$ of Compound (A) in JP-A-2012-21068.

In particular, the organic group represented by each of $L_1$ and $L_2$ is preferably a group represented by -$D_3$-$G_3$-Sp-$P_3$. $D_3$ is same as $D_1$; $G_3$ represents a $C_{6-12}$ divalent aromatic ring or heterocycle or $C_{5-8}$ divalent alicyclic hydrocarbon group; methylene group contained in the alicyclic hydrocarbon group may be substituted by —O—, —S—, —NH— or —NH—, Sp represents a spacer group typically represented by —$(CH_2)_n$—, —$(CH_2)_n$—O—, —$(CH_2$—O—$)_n$— or —$(CH_2CH_2$—O—$)_m$ (n represents an integer of 2 to 12, and m represents an integer of 2 to 6), and $P_3$ represents a polymerizable group such as acryloyl group.

Preferable examples of the compounds represented by the formula (II) will be shown below, without limiting the present invention.

II-1-1
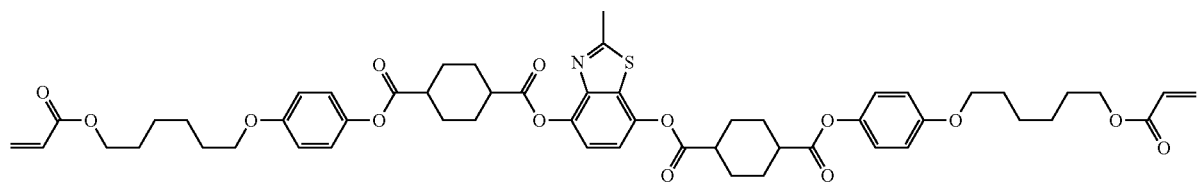

II-1-2
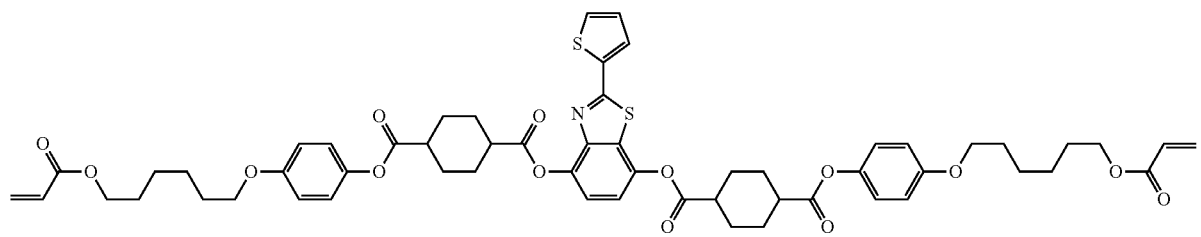

II-2-1
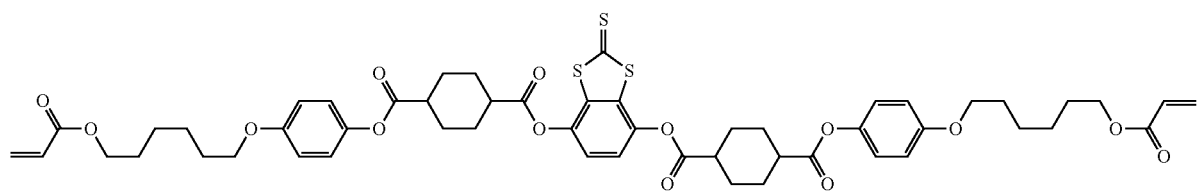

II-2-2
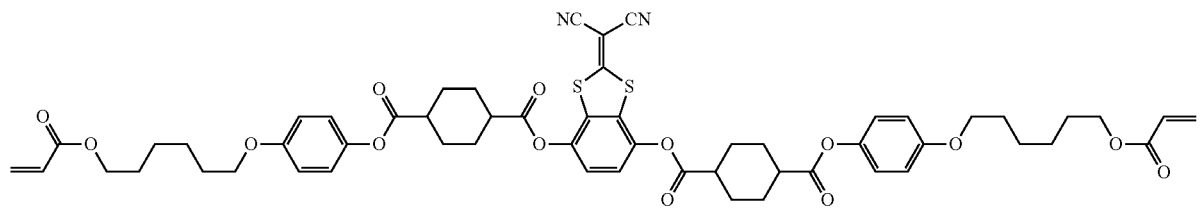

II-2-3
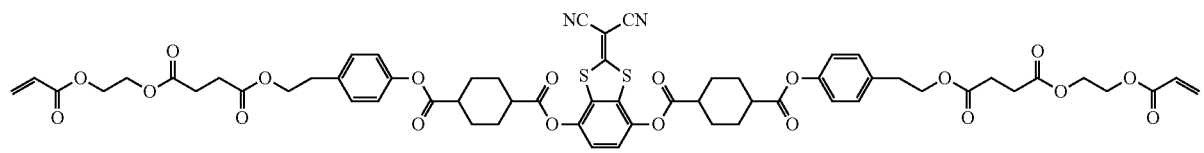

II-2-4
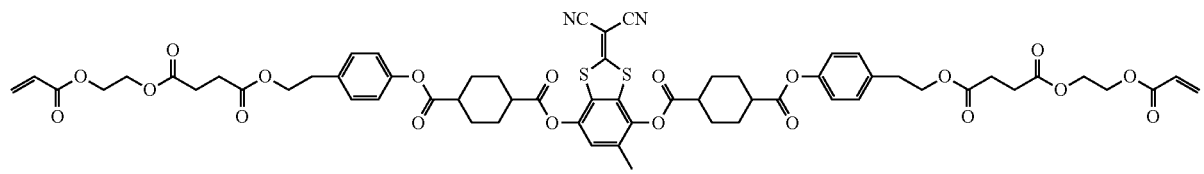

-continued
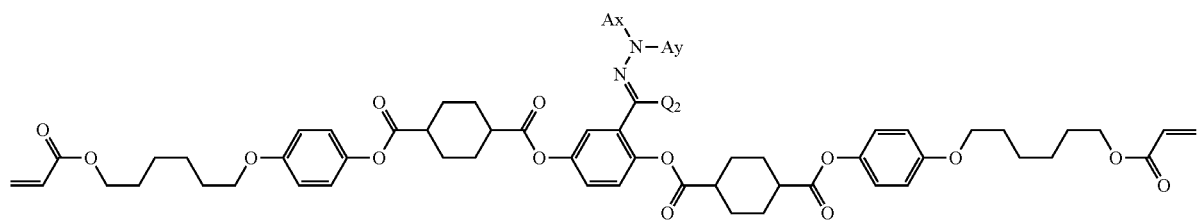
TABLE 2
| No | Ax | Ay | Q₂ |
|---|---|---|---|
| II-3-1 | benzothiazol-2-yl | H | H |
| II-3-2 | benzoxazol-2-yl | H | H |
| II-3-3 | naphthalen-1-yl | H | H |
| II-3-4 | Ph | Ph | H |
| II-3-5 | quinolin-2-yl | H | H |
| II-3-6 | phthalazin-1-yl | H | H |
| II-3-7 | benzothiazol-2-yl | $CH_3$ | H |
| II-3-8 | benzothiazol-2-yl | $C_4H_9$ | H |
| II-3-9 | benzothiazol-2-yl | $C_6H_{13}$ | H |
| II-3-10 | benzothiazol-2-yl | acryloyl | H |
| II-3-11 | benzothiazol-2-yl | benzothiazol-2-yl | H |

TABLE 2-continued

| No | Ax | Ay | $Q_2$ |
|---|---|---|---|
| II-3-12 | benzothiazol-2-yl | CH₂CN | H |
| II-3-13 | benzothiazol-2-yl | cyclohexyl | H |
| II-3-14 | benzothiazol-2-yl | isobutyl (3-methylbutyl) | H |
| II-3-15 | benzothiazol-2-yl | CH₂CH₂OH | H |
| II-3-16 | fluoren-9-yl | H | H |
| II-3-17 | benzothiazol-2-yl | CH₂CF₃ | H |
| II-3-18 | benzothiazol-2-yl | H | CH₃ |
| II-3-19 | benzothiazol-2-yl | cyclohexylmethyl | H |
| II-3-20 | benzothiazol-2-yl | CH₂CH₂CH₂CN | H |
| II-3-21 | benzothiazol-2-yl | benzyl | H |
| II-3-22 | benzothiazol-2-yl | 4-methylphenylsulfonyl | H |
| II-3-23 | benzothiazol-2-yl | CH₂CH₂OCH₂CH₂OCH₃ | H |
| II-3-24 | benzothiazol-2-yl | butyryl (C(O)CH₂CH₂CH₃) | H |

TABLE 2-continued
| No | Ax | Ay | Q2 |
|---|---|---|---|
| II-3-25 | 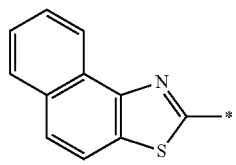 | C6H13 | H |
| II-3-26 | 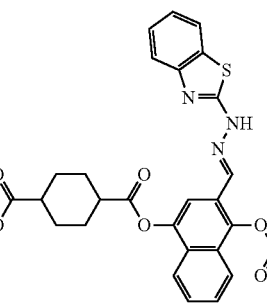 | | |
| II-3-27 | 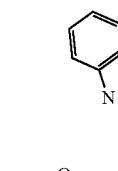 | | |
| II-3-28 | 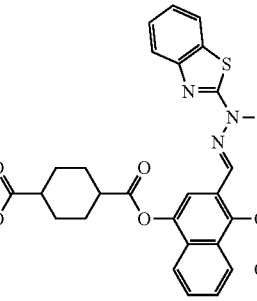 | | |
| II-3-29 | 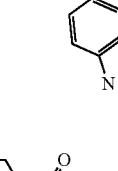 | | |

TABLE 3
| No | Ax | Ay | Q₂ |
|---|---|---|---|
| II-3-30 | 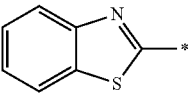 | H | H |
| II-3-31 | 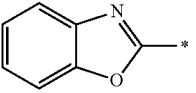 | H | H |
| II-3-32 | 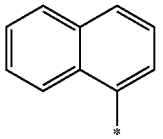 | H | H |
| II-3-33 | Ph | Ph | H |
| II-3-34 | 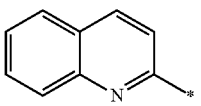 | H | H |
| II-3-35 | 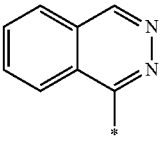 | H | H |
| II-3-36 | 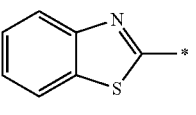 | $CH_3$ | H |
| II-3-37 | 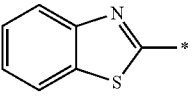 | $C_4H_9$ | H |
| II-3-38 | 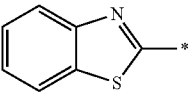 | $C_6H_{13}$ | H |
| II-3-39 | 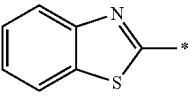 | 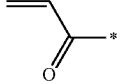 | H |
| II-3-40 | 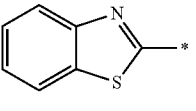 | 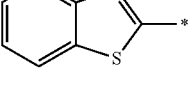 | H |
| II-3-41 | 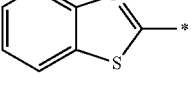 | $CH_2CN$ | H |
| II-3-42 | 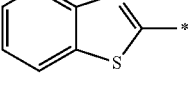 | 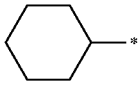 | H |
| II-3-43 | 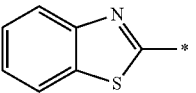 | 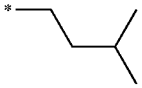 | H |

TABLE 3-continued
| No | Ax | Ay | $Q_2$ |
|---|---|---|---|
| II-3-46 | 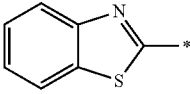 | $CH_2CH_2OH$ | H |
| II-3-45 | 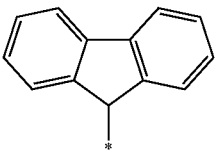 | H | H |
| II-3-46 | 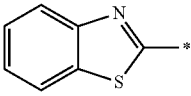 | $CH_2CF_3$ | H |
| II-3-47 | 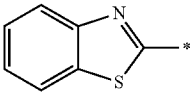 | H | $CH_3$ |
| II-3-48 | 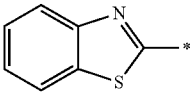 | 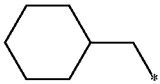 | H |
| II-3-49 | 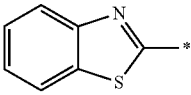 | 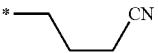 | H |
| II-3-50 | 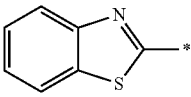 | 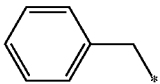 | H |
| II-3-51 | 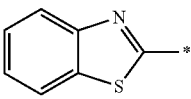 | 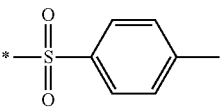 | H |
| II-3-52 | 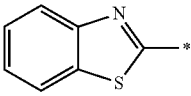 | 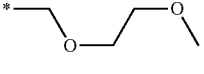 | H |
| II-3-53 | 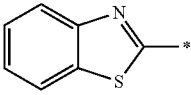 | 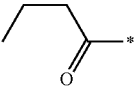 | H |
| II-3-54 | 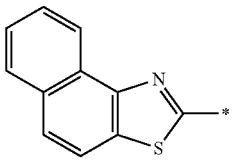 | $C_6H_{13}$ | H |

TABLE 3-continued

| No | Ax | Ay | Q₂ |
|---|---|---|---|
| II-3-55 | 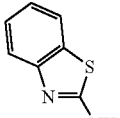 | | |
| II-4-1 | 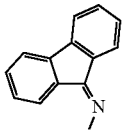 | | |
| II-4-2 | 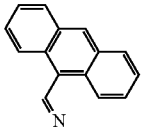 | | |
| II-4-3 | 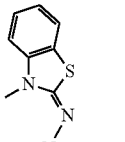 | | |

The content of the polymerizable rod-like liquid crystal compound showing smectic phase is preferably 50 to 98% by mass, more preferably 70 to 95% by mass of the total solid content of the polymerizable composition.

[Polymerizable Composition]

The polymerizable composition used in the present invention may be added with polymerizable rod-like compound, any solvent and additive, besides at least one of polymerizable rod-like liquid crystal compound showing smectic phase.

(Polymerizable Rod-Like Compound)

The polymerizable composition may be added with a polymerizable rod-like compound, besides the polymerizable rod-like liquid crystal compound. The polymerizable rod-like compound does not always necessarily have liquid crystallinity. By adding the polymerizable rod-like compound, temperature range of the smectic phase of the polymerizable composition may be controlled.

Since the polymerizable rod-like compound is used while being mixed with the polymerizable rod-like liquid crystal compound showing smectic phase, and is handled as a polymerizable composition, any of those highly compatible with the polymerizable rod-like liquid crystal compound showing smectic phase is preferably used.

In particular, those having a structure represented by the formula (2) below are preferably used.

$$Q^3\text{-}SP^3\text{—}X^3\text{-}M^3\text{-}(Y^3\text{-}L\text{-}Y^4\text{-}M^4)_m\text{-}X^4\text{—}SP^4\text{-}Q^4 \quad \text{Formula (2):}$$

where, m is an integer representing the number of repetition of $(Y^3\text{-}L\text{-}Y^4\text{-}M^4)$ which is 0 or more, each of $Q^3$ and $Q^4$ represents a polymerizable group, SP$^3$ and SP$^4$ represent a same group which is a straight-chain or branched alkylene group, or, a group composed of a combination of a straight-chain or branched alkylene group, with —O— and/or —C(=O)—, having 2 to 8 carbon atoms in total;

X$^3$ and X$^4$ represent a same group which is a single bond or oxygen atom;

—Y$^3$-L-Y$^4$— represents a straight-chain alkylene group, or, a group composed of a combination of straight-chain alkylene group with —O— and/or —C(=O)—, having 3 to 18 carbon atoms in total; and each of M$^3$ and M$^4$ represents a group composed of two or more aromatic rings, and —O— and/or —C(=O)—.

The groups composing the formula (2) may be same as those in the formula (1). A polymerizable group of the polymerizable rod-like liquid crystal compound and a polymerizable group of the polymerizable rod-like compound may be same or different, and preferably same.

When the polymerizable rod-like compound is used, the amount of the compound is preferably 1 to 50% by mass, preferably 5 to 45% by mass of the polymerizable rod-like liquid crystal compound showing smectic phase.

In the present invention, also combined use of two or more different rod-like liquid crystalline compounds is a preferable mode of embodiment, in view of suppressing crystallization. The rod-like liquid crystal to be combined may be a monofunctional or non-polymerizable liquid crystal.

A particularly preferable embodiment of the present invention is that two different polymerizable rod-like liquid crystal compounds, represented by the formula (II) above, are used in combination. Best embodiment is such that Ar in the formula (II) is (II-2), and that two species differ in the structure of (II-2).

(Non-Liquid Crystalline Multifunctional Polymerizable Compound)

The polymerizable composition may be added with a non-liquid crystalline multifunctional polymerizable compound. By adding the non-liquid crystalline multifunctional polymerizable compound, the layers of the smectic phase will be coupled via the non-liquid crystalline multifunctional polymerizable compound, so that the layer are prevented from being too close.

Examples of the non-liquid crystalline multifunctional polymerizable compound include ester of polyhydric alcohol and (meth)acrylic acid (i.e., ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,2,3-cyclohexane tetramethacrylate, polyurethane polyacrylate, polyester polyacrylate); vinylbenzene and its derivative (i.e., 1,4-divinylbenzene, 4-vinylbenzoic acid-2-acryloylethyl ester, 1,4-divinylcyclohexanone); vinylsulfone (i.e., divinylsulfone); acrylamide (i.e., methylenebisacrylamide); and methacrylamide.

Note now that if the amount of addition of the non-liquid crystalline multifunctional polymerizable compound increases, the developability of retardation by the optically anisotropic layer will be diluted, so that the amount of addition is preferably 0 to 20% by mass in terms of solid concentration, more preferably 0 to 10% by mass, and particularly 0 to 5% by mass. The amount of addition in terms of solid concentration is preferably 0.1 to 20% by mass, more preferably 0.1 to 10% by mass, furthermore preferably 0.1 to 5% by mass, or, preferably 1 to 20% by mass, more preferably 1 to 10% by mass, and particularly 1 to 5% by mass.

(Polymerization Initiator)

In need of fixation while keeping the state of alignment, the liquid crystalline compound is polymerized by a polymerization reaction participated by a polymerizable group introduced thereinto. For this purpose, the coating liquid is preferably added with a polymerization initiator. The polymerization reaction includes heat polymerization using a heat polymerization initiator, photo-polymerization using a photo-polymerization initiator, and EB curing using electron beam. Among them, photo-polymerization is preferable, in which the amount of addition is preferably 1 to 5% by mass of the total polymerizable compound which includes the polymerizable rod-like liquid crystal compound showing smectic phase and other polymerizable rod-like compound.

Examples of the additive used when the optically anisotropic layer is formed using the polymerizable composition, other than those described above, include surfactant for controlling surface property or surface profile, additive (alignment auxiliary) for controlling tilt angle of the liquid crystalline compound, additive (plasticizer) for lowering the alignment temperature, polymerizable monomer, and chemicals for imparting other functionality. They may be used by suitable choice.

(Solvent)

For the purpose of improving the manufacturability, such as lowering the viscosity in the process of forming the optically anisotropic layer, the polymerizable composition may be added with a solvent.

The solvent usable here is not specifically limited so long as it does not degrade the manufacturability. The solvent is preferably at least one selected from the group consisting of ketone, ester, ether, alcohol, alkane, toluene, chloroform and methylene chloride, more preferably at least one selected from the group consisting of ketone, ester, ether, alcohol and alkane, and particularly at least one selected from the group consisting of ketone, ester, ether and alcohol.

The amount of use of the solvent is generally 50 to 90% by mass in terms of concentration in the polymerizable composition, but not limited thereto.

[Laminate and Method of Manufacturing the Same]

The laminate of the present invention comprises the optically anisotropic layer of the present invention.

Examples of the laminate of the present invention includes, but not specifically limited to, a laminate having the optically anisotropic layer of the present invention formed over the surface of the photo-aligned film; a laminate having the optically anisotropic layer of the present invention formed over the surface of the rubbed alignment film; and a laminate having a uniaxial birefringence layer, which has the refractive index in the thickness direction larger than the refractive index in the in-plane direction (that is, positive A-plate), formed over the surface of the optically anisotropic layer of the present invention.

[Methods of Manufacturing Optically Anisotropic Layer and Laminate]

The optically anisotropic layer of the present invention is obtained by coating the above-described polymerizable composition over the support, followed by aligning, and fixation of the aligned state.

(Support)

The support used for forming the optically anisotropic layer is not specifically limited.

For the case where the optically anisotropic layer after formed is used by peeling it from the support, the support may be composed of a material capable of yielding an easy-to-peel surface. This sort of tentative support used for the convenience of forming may be configured by glass, or polyester film not subjected to easy adhesion treatment.

It is also preferable to form the optically anisotropic layer on a transparent polymer film and then to use them in the form of laminate. Materials for composing the polymer film, intended for use in the form of laminate, are preferably selectable from those used as optical materials, which include cellulose, cyclic olefin, acryl, polycarbonate, polyester, and polyvinyl alcohol.

Alternatively, the optically anisotropic layer may be formed directly, without being laminated with the polymer film, on a rubbed polarizer to be used in the form of thin-film polarizing plate, or directly on a glass substrate for the liquid crystal cell.

(Alignment Process and Alignment Film)

In the process of forming the optically anisotropic layer, there needs to be some technique for aligning molecules of the liquid crystalline compound in the composition to a desired state. It is general to use, for example, an alignment film to align the liquid crystalline compound to a desired direction. The alignment film is exemplified by rubbed film of organic compound such as polymer; obliquely deposited film of inorganic compound; micro-grooved film; and accumulated membrane composed of an organic compound such as ω-tricosanoic acid, dioctadecylmethylammonium chloride or methyl stearate, obtained by the Langmuir-Blodgett (LB) method. A film obtained by rubbing the surface of a polymer layer is preferably used as the alignment film. The rubbing process is implemented by rubbing the surface of the polymer layer with paper or cloth, several times unidirectionally. Polymers preferably usable for the alignment film include polyimide, polyvinyl alcohol, polymerizable group-containing polymer described in JP-A-H09-152509, and orthogonal alignment film described in JP-A-2005-97377, JP-A-2005-99228, and JP-A-2005-128503. Note that the orthogonal alignment film in the context of the present invention is an alignment film capable of aligning the longitudinal axis of the molecule of the polymerizable rod-like liquid crystal compound of the present invention, in the direction substantially orthogonal to the direction of rubbing of the orthogonal alignment film. The alignment film need not be so thick, so long it can provide an alignment function, and is preferably 0.01 to 5 μm thick, and more preferably 0.05 to 2 μm thick.

It is also preferable to use a so-called, photo-aligned film, which is obtained by irradiating a photo-alignable material with polarized light of non-polarized light. Namely, a photo-alignable material may be coated on a support, to form the photo-aligned film. Polarized light may be irradiated onto the photo-aligned film vertically or obliquely, whereas non-polarized light may be irradiated obliquely to the photo-aligned film.

The photo-alignable material usable for the photo-aligned film in the present invention is described a number of literatures. Preferable examples of the materials usable for the photo-aligned film of the present invention include azo compounds described in JP-A-2006-285197, JP-A-2007-76839, JP-A-2007-138138, JP-A-2007-94071, JP-A-2007-121721, JP-A-2007-140465, JP-A-2007-156439, JP-A-2007-133184, JP-A-2009-109831, JP-B-3883848 and JP-B-4151746; aromatic ester compound described in JP-A-2002-229039; maleimide and/or alkenyl-substituted nadic imide compound having photo-alignable unit described in JP-A-2002-265541 and JP-A-2002-317013; photo-crosslinkable silane derivatives described in JP-B-4205195 and JP-B-4205198; photo-crosslinkable polyimides, polyamides, or esters described in JP-T-2003-520878, JP-T-2004-529220 and JP-B-4162850; photo-dimerizable compounds described in JP-A-H09-118717, JP-T-H10-506420, JP-T-2003-505561, WO2010/150748, JP-A-2013-177561 and JP-A-2014-12823, especially cinnamate compound, chalcone compound and coumarin compound. Azo compound, photo-crosslinkable polyimide, polyamide, ester, cinnamate compound, and chalcone compound are particularly preferable.

Specific examples of particularly preferable photo-alignable material are exemplified by the compounds represented by the formula (X) below, described in JP-A-2006-285197:

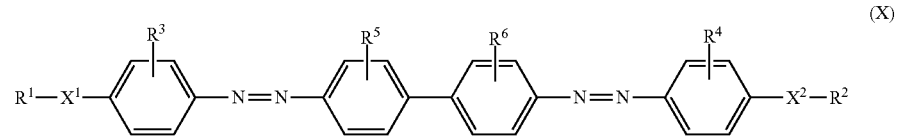

(X)

(where, each of $R^1$ and $R^2$ independently represents a hydroxy group, or a polymerizable group selected from the group consisting of (meth)acryloyl group, (meth)acryloyloxy group, (meth)acrylamide group, vinyl group, vinyloxy group, and maleimide group.

When $R^1$ is a hydroxy group, $X^1$ represents a single bond, and when $R^1$ is a polymerizable group, $X^1$ represents a linking group represented by $-(A^1-B^1)_m-$. When $R^2$ is a hydroxy group, $X^2$ represents a single bond, and when $R^2$ or $R^8$ is a polymerizable group, $X^2$ represents a linking group represented by $-(A^2-B^2)_n-$. Now $A^1$ combines with $R^1$ or $R^7$, $A^2$ combines with $R^2$ or $R^8$, and, each of $B^1$ and $B^2$ combines with the respective adjacent phenylene group. Each of $A^1$ and $A^2$ independently represents a single bond, or divalent hydrocarbon group, and each of $B^1$ and $B^2$ independently represents a single bond, —O—, —CO—O—, —O—CO—, —CO—NH—, —NH—CO—, —NH—CO—O—, or —O—CO—NH—. Each of m and n independently represents an integer of 0 to 4. When m or n is 2 or larger, a plurality of each of $A^1$, $B^1$, $A^2$ and $B^2$ may be same or different. $A^1$ or $A^2$, held between two ($B^1$)s or ($B^2$)s is not a single bond. Each of $R^3$ and $R^4$ independently represents a hydrogen atom, halogen atom, carboxy group, halogenated methyl group, halogenated methoxy group, cyano group, nitro group, —$OR^7$ (where, $R^7$ represents a $C_{1-6}$ lower alkyl group, $C_{3-6}$ cycloalkyl group or $C_{1-6}$ lower alkyl group substituted by $C_{1-6}$ lower alkoxy group), $C_{1-4}$ hydroxyalkyl group, or —$CONR^8R^9$ (each of $R^8$ and $R^9$ independently represents a hydrogen atom or $C_{1-6}$ lower alkyl group), or methoxycarbonyl group. The carboxy group may form a salt with an alkali metal. Each of $R^5$ and $R^6$ independently represents a carboxy group, sulfo group, nitro group, amino group, or hydroxy group. Each of carboxy group and sulfo group may form a salt with an alkali metal.)

By appropriately selecting the material for the alignment film, the alignment film may be peeled from the tentative support, or only the optically anisotropic layer may be peeled. More specifically, by bonding or transferring the thus peeled optically anisotropic layer, a thin optically anisotropic layer of several micrometers thick may be provided. Another preferable embodiment is such as forming, by coating, the rubbed alignment film or photo-aligned film directly onto the linear polarizer, and then subjecting the film to rubbing or photo-alignment process to impart an aligning function. In other words, the laminate of the present invention may have a linear polarizer, on the surface of which a photo-aligned film or rubbed alignment film is formed.

In the present invention, the pre-tilt angle of the polymerizable rod-like liquid crystal compound contained in the optically anisotropic layer can be 0°. Therefore, it is particularly preferable that a photo-aligned film is used as the alignment film. By using a retardation film which contains the optically anisotropic layer having a pre-tilt angle of 0° in the IPS-mode device particularly, it becomes possible to properly balance high front contrast as a result of suppressed leakage of light and good viewing angle dependence as a result of reduced change in hue in oblique view. In one preferred embodiment, the photo-aligned film used in the present invention is given an alignment-regulating performance, by irradiating thereonto polarized light vertically or obliquely, or by irradiating thereonto non-polarized light obliquely. The oblique direction in the process of oblique irradiation preferably lies in the direction of 5° to 45° to the photo-aligned film, and more preferably in the direction of 10° to 30°. Irradiation dose of UV light is preferably 200 to 2000 mJ/cm$^2$.

(Control of Phase Transition)

The liquid crystal phase of the rod-like liquid crystalline compound may be changed generally by changing temperature or pressure. Lyotropic liquid crystal may be changed also by the amount of solvent. In the present invention, phase transition under temperature change is preferable, taking subsequent operations for fixing the state of smectic phase into consideration.

It is general that temperature range in which the rod-like liquid crystalline compound develops the nematic phase, is higher than the temperature range in which the rod-like liquid crystalline compound develops the smectic phase. It is preferable to heat the rod-like liquid crystalline compound up to the temperature range where the compound develops the nematic phase, and then to decrease the heating temperature down to the temperature range where the rod-like liquid crystalline compound develops the smectic phase, so that the rod-like liquid crystalline compound is changed from the nematic phase to the smectic phase.

In the present invention, the temperature at which the polymerizable composition containing the polymerizable rod-like liquid crystal compound changes from the smectic phase to the nematic phase, is preferably 100° C. or lower, more preferably 90° C. or lower, furthermore preferably 80° C. or lower, and particularly 70° C. or lower. The lower limit of the temperature at which the smectic phase changes into the nematic phase is generally 20° C. or higher, although not specifically limited.

The temperature at which the polymerizable composition changes from the smectic phase into the nematic phase can be easily determined by observation under a polarizing microscope. For example, the nematic phase develops its unique Schlieren texture, whereas the smectic-A phase appears with focalconic fan texture, so that the phase transition temperature may be determined by observing the texture under a polarizing microscope under heating or cooling.

In the temperature range where the rod-like liquid crystalline compound develops the nematic phase, it is necessary to heat the rod-like liquid crystalline compound for a certain length of time before the compound finishes to form monodomain. The heating time is preferably 10 seconds to 20 minutes, more preferably 10 seconds to 10 minutes, and most preferably 10 seconds to 5 minutes.

In the temperature range where the rod-like liquid crystalline compound develops the smectic phase, it is necessary to heat the rod-like liquid crystalline compound for a certain length of time before the compound develops the smectic phase. The heating time is preferably 10 seconds to 20 minutes, more preferably 10 seconds to 10 minutes, and most preferably 10 seconds to 5 minutes.

In the present invention, also a polymerizable rod-like liquid crystal compound capable of showing a higher order of smectic phase, together with the nematic phase, may be used as the polymerizable rod-like liquid crystal compound, by which the nematic phase may be improved to have high contrast with a reduced amount of scattered component, unlike the usual nematic phase. This feature will be achieved distinctively, particularly when the reverse-wavelength-dispersion liquid crystalline compound, represented by the formula (II) above, is used.

Accordingly, in another preferable embodiment of the present invention, the rod-like liquid crystalline compound may be heated in the temperature range where the nematic phase develops so as to produce the monodomain in this temperature range, followed by fixation. The retardation film manufactured according to this embodiment was found to achieve a contrast which is distinctively larger than that achievable by the usual retardation film manufactured using a rod-like liquid crystalline compound capable of showing the nematic phase only.

In the temperature range where the rod-like liquid crystalline compound appears in the nematic phase, it is necessary to heat the rod-like liquid crystalline compound for a certain length of time before the compound finishes to form mono-domain. The heating time is preferably 10 seconds to 20 minutes, more preferably 10 seconds to 10 minutes, and most preferably 10 seconds to 5 minutes.

For the case where a compound, showing phase transition under heating in the order of smectic phase→nematic phase→isotropic phase is used, the composition is once heated to, or above, the phase transition temperature between the nematic phase and isotropic phase, and then gradually cooled at a predetermined rate down to, or below, the phase transition temper between the smectic phase and the nematic phase, or the phase transition temperature between the smectic phase and the isotropic phase. Thus the composition may be changed via the nematic phase to the smectic phase. The temperature reached after cooling is preferably 10° C. or more lower than the phase transition temperature between the smectic phase and the nematic phase, or the phase transition temperature between the smectic phase and the isotropic phase. The rate of cooling is preferably 1 to 100° C./min, and more preferably 5 to 50° C./min. Too fast rate of cooling would result in alignment failure, whereas too slow rate would result in prolonged time of manufacturing.

It is also possible in the present invention to control the till angle of the optically anisotropic layer, by inclining the molecules of the liquid crystalline compound, while keeping the primary structures of the smectic phase appropriately spaced from each other.

Methods of controlling the tilt angle of the liquid crystalline compound include a method of creating a pre-tilt angle using an alignment film manufacture by controlled rubbing; and a method of adding a tilt angle control agent to the liquid crystal layer so as to control the polar angle on the support side or air interface side. Both methods are preferably combined.

The tilt angle control agent is typically a copolymer of fluoroaliphatic group-containing monomers. Preferable examples include copolymer with a functional group of aromatic condensed ring; and a copolymer with a monomer having a carboxy group, sulfo group, phosphonoxy group, or salts thereof. The tilt angle will be controllable in a more precise and stable manner, by using a plurality of tilt angle control agents. Such tilt angle control agents may be referred to those described in paragraphs [0022] to [0063] of JP-A-2008-257205, and paragraphs [0017] to [0124] of JP-A-2006-91732.

The nematic liquid crystal has no highly ordered structure, less susceptible to polymerization shrinkage when the state of alignment is fixed by polymerization, and thereby a homogeneous alignment with a tilt angle of 10° or smaller may be obtained as a consequence. On the other hand, the smectic liquid crystal has a laminar structure, and the layer as a whole can incline due to shrinkage in volume or strain in the process of fixation based on polymerization or supercooling. The smectic liquid crystal will therefore have an increased tilt angle, will fail to achieve the homogeneous alignment, and (i) will produce defects due to the inclination, and will result in light scattering and degraded contrast, and (ii) will produce asymmetry due to the inclination, and will fail, in particular in an IPS-mode device based on optical alignment, in compensating a liquid crystal display (liquid crystal in the cell has a tilt angle of 0°). The present inventors found out specific techniques for achieving a tilt angle of 10° or smaller, in the process of fixation by polymerization of the smectic liquid crystal, including the following:

a method of using a compound represented by the formula (I) in combination with a compound represented by the formula (2), aimed to relax strain in the laminar structure of the smectic phase;

a method of using smectic liquid crystal with reverse wavelength dispersion (typically any of compounds represented by the formula (II)) (in-plane alignment, or a tilt angle of 10° or smaller, is achievable by virtue of the molecular geometry bulged in the direction orthogonal to the longitudinal direction of the molecule, and of increased planarity as a consequence);

a method of using a tilt angle control agent (tilt angle control agent effective at the boundary with the air), aimed to impart anchoring force in the direction of polar angle, also at the interface with the air; and a method of using a photo-aligned film.

(Fixation of State of Alignment)

The state of alignment may be fixed by heat polymerization, or polymerization assisted by active energy ray, and by appropriately selecting polymerizable group or polymerization initiator suitable for the polymerization. Considering now the manufacturability, preferably used is polymerization under UV irradiation. If the dose of UV irradiation is insufficient, an unpolymerized portion of the polymerizable rod-like liquid crystal will remain, which is causative of temperature-dependent or time-dependent degradation of the optical characteristic.

It is therefore preferable to determine conditions for irradiation so as to suppress the content of the residual polymerizable rod-like liquid crystal to 5% or below. The irradiation is preferably given at a dose of 200 mJ/cm$^2$ or more as a guide, although the conditions for irradiation may vary depending on formulation of the polymerizable composition or thickness of the optically anisotropic layer.

[Application of Optically Anisotropic Layer]

The optically anisotropic layer of the present invention may be preferably used for various applications, by virtue of its large developability of retardation and low depolarization, as a result of high orderliness of alignment of the liquid crystalline compound attributable to the smectic phase. The optically anisotropic film is useful, for example, as optical compensation film used for optical compensation of liquid crystal cell, wide-band λ/4 plate used for preventing reflection of external light on organic EL display device, or, retardation plates such as λ/2 plate and λ/4 plate.

The optically anisotropic layer of the present invention can also yield scatterless, high contrast A-plate or quasi-A-plate. In particular, since it can yield A-plate or quasi-A-plate with reverse wavelength dispersion, so that it is preferably used as wide-band λ/4 plate of organic EL display device, or as optical compensation film of liquid crystal display device.

In particular, since the optically anisotropic layer of the present invention can yield A-plate or quasi-A-plate with suppressed tilt angle, it is preferably used as optical compensation film for IPS-mode or FFS-mode liquid crystal display device which uses a photo-aligned film with a pre-tilt angle of 0°.

In this specification, any optically anisotropic film having a small tilt angle (low tilt angle), typically 10° or smaller and particularly 1° or smaller, is assumed as a uniaxial birefringence layer having the slow axis substantially in the in-plane direction.

One exemplary embodiment of the optically anisotropic layer of the present invention relates to a positive A-plate having Re(450), Re(550) and Re(650), being retardation values measured at 450 nm, 550 nm and 650 nm respectively, which satisfy the formulae (1) to (3) below:

$$100 \leq Re(550) \leq 180 \text{ nm} \qquad \text{Formula (1)}$$

$$0.70 \leq Re(450)/Re(550) \leq 0.90 \qquad \text{Formula (2)}$$

$$1.00 \leq Re(650)/Re(550) \leq 1.30 \qquad \text{Formula (3)}$$

The optically anisotropic layer may further be laminated with a positive C-plate having Rth(550), being a thickness retardation value measured at 550 nm, which satisfies the formula (4) below. By using the laminate, for example, as an optical compensation film of the IPS-mode device or an anti-reflection film for the organic EL display device, hue changes and leakage of light in oblique view can be improved to a large degree.

$$-180 \leq Rth(550) \leq -10 \qquad \text{Formula (4)}$$

The positive C-plate in the present invention preferably satisfies $-5 \leq Re(550) \leq 5$ ($|Re(550)| \leq 5$), and more preferably satisfies $-3 \leq Re(550) \leq 3$ ($|Re(550)| \leq 3$).

The positive C-plate also preferably satisfies $-300 \leq Rth(550) \leq 0$, more preferably satisfies $-200 \leq Rth(550) \leq -60$, and furthermore preferably satisfies $-180 \leq Rth(550) \leq -80$.

The positive C-plate is particularly preferable when the Rth(450), Rth(550) and Rth(650), which are thickness retardation values measured at 450 nm, 550 nm and 650 nm, satisfy the formulae (1) and (2) below:

$$0.70 \leq Rth(450)/Rth(550) \leq 1.00 \quad \text{Formula (1)}$$

$$0.99 \leq Rth(650)/Rth(550) \leq 1.30 \quad \text{Formula (2)}$$

By the setting within these ranges, the effect of the present invention is fully demonstrated when the optical anisotropic layer is incorporated into the IPS-mode liquid crystal display device.

Also style of use of the optically anisotropic layer is not specifically limited. For example, the optically anisotropic layer may be formed directly on the substrate of the liquid crystal cell or rubbed surface of the polarizer, or may be combined with a polymer film or other optical film by laminating or bonding, and used in the form of laminate with controlled optical and mechanical characteristics.

[Polarizing Plate]

The present invention also relates to a polarizing plate having at least a polarizer, and the optically anisotropic layer or the laminate of the present invention. In one embodiment of the polarizing plate of the present invention, the optically anisotropic layer or the laminate of the present invention is laminated on one surface of the polarizer, and a protective film is laminated on the other surface. The protective film is preferably selected from polymer film usable as the support, without special limitation. The protective film is preferably exemplified by cellulose acylate film such as triacetyl cellulose film.

The polarizer includes iodine-containing polarizer, dye-containing polarizer which contains a dichroic dye, and polyene-based polarizer, all of them are usable for the present invention. The iodine-containing polarizer and dye-containing polarizer are generally manufactured using polyvinyl alcohol film.

The slow axis of the optically anisotropic layer of the present invention and the absorption axis of the linear polarizer preferably form an angle of 45°±10° to 90°±10°, and more preferably 45° to 90°.

For the case where the polarizer, the positive A-plate and the positive C-plate are laminated in this order, the direction of slow axis of the positive A-plate and the direction of absorption axis of the polarizer preferably form an angle of 90°±10°.

For the case where the polarizer, the positive C-plate and the positive A-plate are laminated in this order, the direction of slow axis of the positive A-plate and the direction of absorption axis of the polarizer are preferably in parallel. With such angular setting, the effect of the present invention is more distinctively demonstrated when incorporated into an IPS-mode liquid crystal display device.

For the case where the polarizer and the positive A-plate are laminated in this order, the direction of slow axis of the positive A-plate and the direction of absorption axis of the polarizer preferably form an angle of 45°±10°. With such angular setting, the effect of the present invention is more distinctively demonstrated when incorporated into an organic EL display device.

[Liquid Crystal Display Device]

The present invention also relates to a liquid crystal display device which comprises the optically anisotropic layer or the laminate of the present invention.

The liquid crystal display device generally has a liquid crystal cell, and two polarizing plates disposed on both sides thereof, and the liquid crystal cell has two electrode substrates and a liquid crystal layer held in between. One optically anisotropic layer may optionally be disposed between the liquid crystal cell and one of the polarizing plates, or two optically anisotropic layers may be disposed respectively between the liquid crystal cell and each of the polarizing plates.

The liquid crystal cell is preferably based on the TN mode, VA mode, OCB mode, IPS mode or ECB mode, and is more preferably based on the IPS mode. The IPS mode based on photo-alignment is particularly preferable.

[Organic EL Display Device]

The present invention also relates to an organic EL display device which has the optically anisotropic layer or laminate of the present invention.

In the organic EL display device, an anti-reflection plate may be configured by disposing a polarizer, the optically anisotropic layer, and an organic EL panel in this order.

The organic EL panel is a component which comprises a luminescent layer or a plurality of organic component films including the luminescent layer, between a pair of electrodes which, are anode and cathode. Besides the luminescent layer, a hole injection layer, a hole transport layer, an electron injection layer, an electron transport layer and a protective layer may be included, and each of these layers may have other function. The individual layers may be formed using various materials.

The anode is directed to supply hole typically to the hole injection layer, the hole transport layer and the luminescent layer, and may be configured by a metal, alloy, metal oxide, electro-conductive compound or mixtures of these materials, preferably having a work function of 4 eV or larger. Specific examples include electro-conductive metal oxides such as tin oxide, zinc oxide, indium oxide, and indium tin oxide (ITO); metals such as gold, silver, chromium and nickel; mixture or laminate of these metals and electro-conductive oxides; inorganic electro-conductive materials such as copper iodide and copper sulfate; organic electro-conductive materials such as polyaniline, polythiophene, and polypyrrole; and laminate of these materials and ITO. Among them the electro-conductive metal oxides are preferable, and ITO is particularly preferable from the viewpoint of productivity, high conductivity, and translucency. Thickness of the anode is appropriately selectable depending on materials, and is preferably 10 nm to 5μ in general, more preferably 50 nm to 1 μm, and furthermore preferably 100 nm to 500 nm.

EXAMPLES

The characteristic features of the invention are described more concretely with reference to the following Examples and Comparative Examples. In these Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

Example 1

<Manufacture of Support>

A 60-μm-thick cellulose acylate film (Re: 1 nm, Rth: −6 nm, haze: 0.2%) was manufactured according to a method of manufacturing cellulose acylate film F-2, described in Example 1 of JP-A-2009-098674.

<Saponification of Support>

A commercially available triacetyl cellulose film "Z-TAC" (from Fujifilm Corporation) was used as a support.

Z-TAC was allowed to pass over an induction heating roll at 60° C. to elevate the temperature of the film surface to 40° C., and an alkali solution having the composition below was coated over one surface of the film, using a bar coater with an amount of coating of 14 ml/m², then heated to 110° C., and allowed to travel under a far infrared heater with steamer from Noritake Co., Ltd. for 10 seconds. Again using the bar coater, 3 ml/m² of pure water was coated. Next, water washing process using a fountain coater and dewatering process using air knife were repeated three times, and the support was allowed to travel in a drying zone at 70° C. for 10 seconds for drying. A transparent support of an alkali-saponified acetyl cellulose was thus manufactured.

| Composition of Alkali Solution (parts by mass) | |
| --- | --- |
| Potassium hydroxide | 4.7 parts by mass |
| Water | 15.8 parts by mass |
| Isopropanol | 63.7 parts by mass |
| Surfactant SF-1: $C_{14}H_{29}O(CH_2CH_2O)_{20}H$ | 1.0 part by mass |
| Propylene glycol | 14.8 parts by mass |

<Manufacture of Alignment Film>

On the acetyl cellulose transparent support, a coating liquid for forming alignment film A having the following composition was continuously coated using a #8 wire bar. The coating was dried under a hot air of 60° C. for 60 seconds, and further under a hot air of 100° C. for 120 seconds, to thereby form an alignment film A.

| Composition of Coating Liquid for Forming Alignment Film A | |
| --- | --- |
| Modified polyvinyl alcohol, shown below | 2.4 parts by mass |
| Isopropanol | 1.6 parts by mass |
| Methanol | 36 parts by mass |
| Water | 60 parts by mass |

Modified Polyvinyl Alcohol

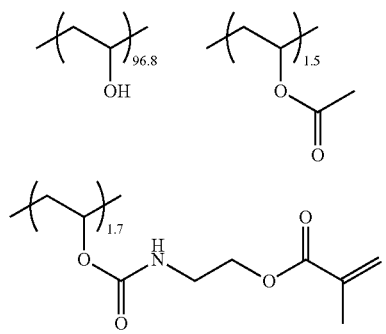

<Manufacture of Optically Anisotropic Layer>

Next, a coating liquid A for forming optically anisotropic layer, having the composition below, was prepared. The coating liquid was coated over the surface of a slide glass, and observed under heating under a polarizing microscope. The phase transition temperature from the smectic-A phase to the nematic phase was found to be 82° C.

| Composition of Coating Liquid A for Forming Optically Anisotropic Layer | |
| --- | --- |
| Smectic liquid crystalline compound Sm-1 | 85 parts by mass |
| Rod-like compound RL-1 | 15 parts by mass |
| Photo-polymerization initiator (Irgacure 907, from BASF) | 3.0 parts by mass |
| Fluorine-containing compound A | 0.8 parts by mass |
| Methyl ethyl ketone | 588 parts by mass |

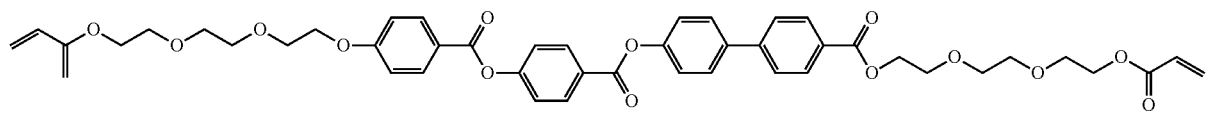

Smectic liquid crystalline compound SM-1

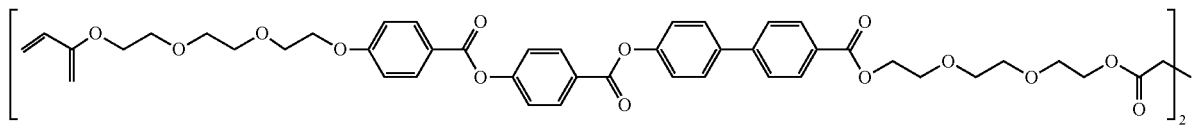

Rod-like compound RL-1

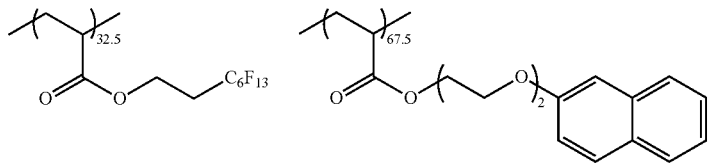

Fluorine-containing compound A

The surface of the alignment film A, formed over the acetyl cellulose transparent support, was then rubbed. The rubbed surface was then coated with the coating liquid A for forming optically anisotropic layer using a bar coater. The film was then ripened under heating at a surface temperature of 100° C. for 60 seconds, cooled down to 70° C., and irradiated under air with 1000 mJ/cm² of UV light using a 70 mW/cm² air-cooled metal halide lamp (from Eye Graphics Co., Ltd.) so as to fix the state of alignment, to thereby form an optically anisotropic layer. In the thus formed optically anisotropic layer, the rod-like liquid crystalline compound was found to align while directing the slow axis in parallel with the direction of rubbing. The optically anisotropic layer was found to be 0.8 μm thick. The incident angle dependence of Re and the tilt angle of the optical axis (that is, angle of inclination of the direction of maximum refractive index of the optically anisotropic layer, to the surface of the optically anisotropic layer) were measured using an automatic birefringence meter (KOBRA-21ADH, from Oji Scientific Co., Ltd.). When measured at 550 nm, Re was found to be 128 nm, and the tilt angle of the optical axis was found to be 2°.

(X-Ray Diffractometry)

The thus formed optically anisotropic layer was analyzed by X-ray diffractometry, using the apparatus below:

X-ray diffractometer ATXG, Cu source (50 kV, 300 mA), Solar slit with angle of aperture of 0.45°

Results of analysis of the optically anisotropic layer manufactured in Example 1 is shown in FIG. 1. A peak indicating a laminar structure was observed at 2θ=2.2°, which was confirmed to be a diffracted light attributable to orderliness of the smectic phase.

Example 2

An optically anisotropic layer was manufactured in the same way as Example 1, except that the temperature of UV irradiation was set to 83° C.

Example 3

An optically anisotropic layer was manufactured in the same way as Example 1, except that the dose of UV irradiation was set to 100 mJ/cm².

Example 4

A coating liquid for forming an alignment film B, having the composition below, was coated on a glass plate using a wire bar coater. The coating was dried under a hot air of 100° C. for 120 seconds, and UV light was irradiated under air using a 300 mW/cm² air-cooled metal halide lamp (from Eye Graphics Co., Ltd.). The thus manufactured photo-aligned film was further irradiated under air vertically with UV light using a 160 mW/cm² air-cooled metal halide lamp (from Eye Graphics Co., Ltd.). The UV light was irradiated through a wire grid polarizer (ProFlux PPL02, from Moxtek, Inc.) which was set in parallel to the photo-aligned film, while aligning the transmission axis of the wire grid polarizer in parallel to the absorption axis of the polarizing plate. Illuminance of the UV light used here was set to 100 mW/cm² in the UV-A region (cumulative in the range from 380 nm to 320 nm), and the dose was set to 1000 mJ/cm² in the UV-A region.

| Composition of Coating Liquid for Forming Alignment Film B | |
|---|---|
| Photo-alignable material, shown below | 2 parts by mass |
| Chloroform | 98 parts by mass |

Photo-alignable material:

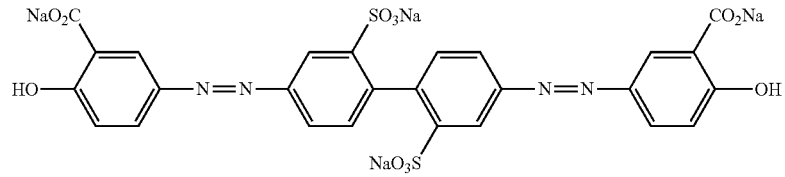

An optically anisotropic layer was then faulted over the alignment film B, in the same way as Example 1. In the thus formed optically anisotropic layer, the rod-like liquid crystalline compound was found to align while directing the slow axis in parallel with the transmission axis of polarizer.

Example 5

An optically anisotropic layer was formed in the same way as Example 1, except that a coating liquid B for forming optically anisotropic layer, having the composition below, was used in place of the coating liquid A for forming optically anisotropic layer, and that the temperature of UV irradiation was set to 85° C. The coating liquid B for forming optically anisotropic layer was found to have a phase transition temperature, from the smectic-A phase to the nematic phase, of 100° C.

| Composition of Coating Liquid B for Forming Optically Anisotropic Layer | |
|---|---|
| Smectic liquid crystalline compound Sm-1 | 100 parts by mass |
| Photo-polymerization initiator A (Irgacure 907, from BASF) | 3.0 parts by mass |
| Fluorine-containing compound A | 0.8 parts by mass |
| Methyl ethyl ketone | 588 parts by mass |

Example 6

An optically anisotropic layer was manufactured in the same way as Example 1, except that a coating liquid C for forming optically anisotropic layer was used in place of the coating liquid A for forming optically anisotropic layer, and that the ripening temperature was set to 90° C., and the temperature of UV irradiation was set to 70° C. The coating liquid C for forming optically anisotropic layer was found to have a phase transition temperature, from the smectic-A phase to the nematic phase, of 75° C.

| Composition of Coating Liquid C for Forming Optically Anisotropic Layer | |
|---|---|
| Smectic liquid crystalline compound Sm-2 | 55 parts by mass |
| Rod-like compound RL-2 | 45 parts by mass |

| Composition of Coating Liquid C for Forming Optically Anisotropic Layer | |
|---|---|
| Triphenylsulfonium tetrafluoroborate | 3.0 parts by mass |
| Fluorine-containing compound A | 0.8 parts by mass |
| Methyl ethyl ketone | 588 parts by mass |

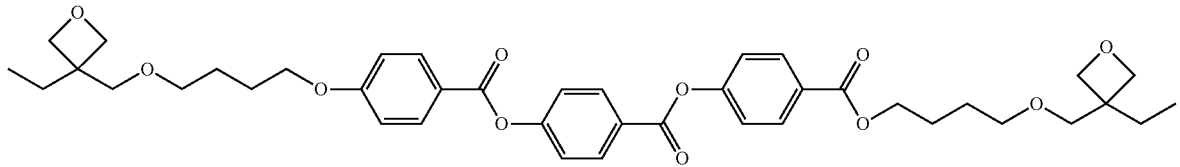

Smectic liquid crystalline compound Sm-2

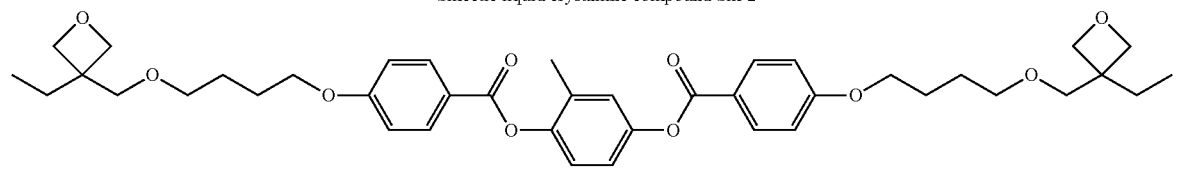

Rod-like compound RL-2

Example 7

An optically anisotropic layer was manufactured in the same way as Example 1, except that a coating liquid D for forming optically anisotropic layer was used in place of the coating liquid A for forming optically anisotropic layer, and that the ripening temperature was set to 120° C., and the temperature of UV irradiation was set to 90° C. Since smectic liquid crystalline compound Sm-3 had only a poor solubility to methyl ethyl ketone, so that chloroform was used as the solvent. The coating liquid D for forming optically anisotropic layer was found to have a phase transition temperature, from the smectic-A phase to the nematic phase, of 115° C., and a phase transition temperature, from the smectic-C phase to the smectic-A phase, of 85° C.

| Composition of Coating Liquid D for Forming Optically Anisotropic Layer | |
|---|---|
| Smectic liquid crystalline compound Sm-3 | 80 parts by mass |
| Rod-like compound RL-3 | 20 parts by mass |
| Photo-polymerization initiator A (Irgacure 907, from BASF) | 3.0 parts by mass |
| Fluorine-containing compound A | 0.8 parts by mass |
| Chloroform | 588 parts by mass |

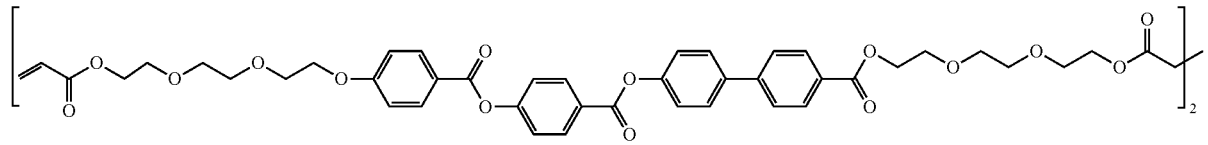

Smectic liquid crystalline compound Sm-3

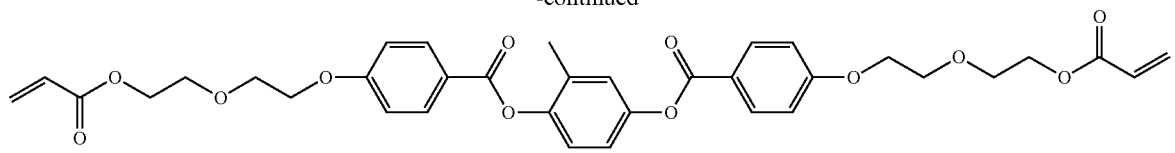

Rod-like compound RL-3

Example 8

An optically anisotropic layer was manufactured in the same way as Example 7, except that a coating liquid E for forming optically anisotropic layer was used in place of the coating liquid D for forming optically anisotropic layer, and that the temperature of UV irradiation was set to 70° C. The coating liquid E for forming optically anisotropic layer was found to have a phase transition temperature, from the smectic-A phase to the nematic phase, of 115° C., and a phase transition temperature, from the smectic-C phase to the smectic-A phase, of 85° C.

| Composition of Coating Liquid E for Forming Optically Anisotropic Layer | |
|---|---|
| Smectic liquid crystalline compound Sm-3 | 80 parts by mass |
| Rod-like compound RL-3 | 20 parts by mass |
| Chiral agent A | 0.05 parts by mass |
| Photo-polymerization initiator A (Irgacure 907, from BASF) | 3.0 parts by mass |
| Fluorine-containing compound A | 0.8 parts by mass |
| Chloroform | 588 parts by mass |

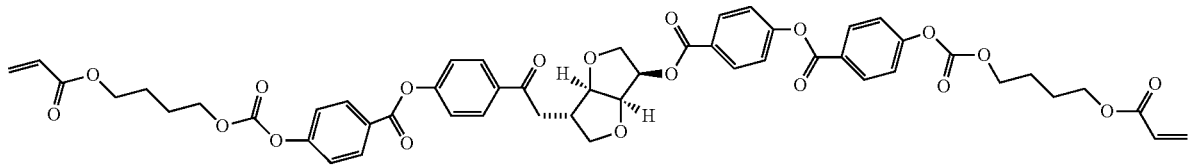

Chiral agent A (LC-756, from BASF)

Example 9

An optically anisotropic layer was manufactured in the same way as Example 1, except that a coating liquid F for forming optically anisotropic layer was used in place of the coating liquid A for forming optically anisotropic layer, and that the ripening temperature was set to 140° C., and the temperature of UV irradiation was set to 123° C. Since smectic liquid crystalline compound Sm-4 had only a poor solubility to methyl ethyl ketone, so that chloroform was used as the solvent. The coating liquid F for forming optically anisotropic layer was found to have a phase transition temperature, from the smectic-A phase to the nematic phase, of 130° C.

| Composition of Coating Liquid F for Forming Optically Anisotropic Layer | |
|---|---|
| Smectic liquid crystalline compound Sm-4 | 55 parts by mass |
| Rod-like compound RL-4 | 45 parts by mass |
| Photo-polymerization initiator (Irgacure 907, from BASF) | 3.0 parts by mass |
| Fluorine-containing compound A | 0.8 parts by mass |
| Chloroform | 588 parts by mass |

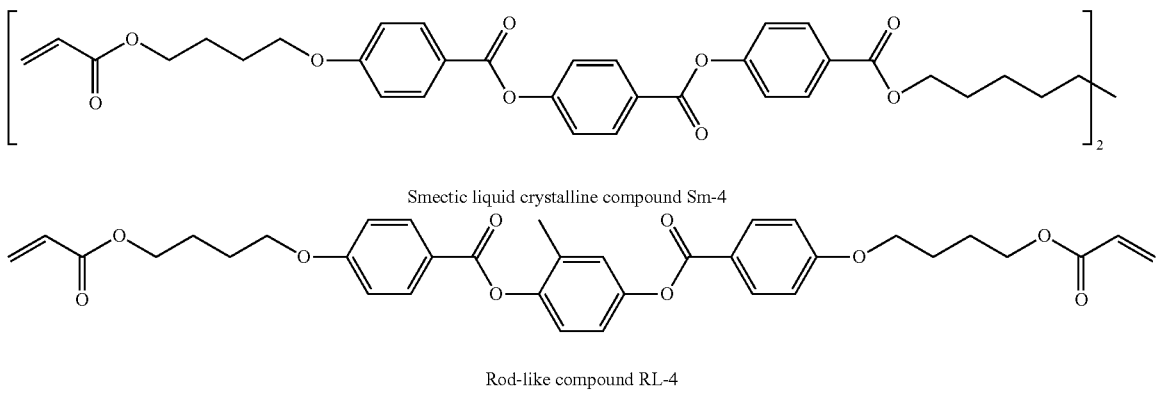

Smectic liquid crystalline compound Sm-4

Rod-like compound RL-4

Example 10

An optically anisotropic layer was manufactured in the same way as Example 1, except that a coating liquid G for forming optically anisotropic layer was used in place of the coating liquid A for forming optically anisotropic layer.

| Composition of Coating Liquid G for Forming Optically Anisotropic Layer | |
|---|---|
| Smectic liquid crystalline compound Sm-1 | 85 parts by mass |
| Rod-like compound RL-1 | 15 parts by mass |
| Photo-polymerization initiator B | 3.0 parts by mass |
| Fluorine-containing compound A | 0.8 parts by mass |
| Methyl ethyl ketone | 588 parts by mass |

Photo-polymerization initiator B

Example 11

An optically anisotropic layer was manufactured in the same way as Example 1, except that a coating liquid H for forming optically anisotropic layer was used in place of the coating liquid A for forming optically anisotropic layer.

| Composition of Coating Liquid H for Forming Optically Anisotropic Layer | |
|---|---|
| Smectic liquid crystalline compound Sm-1 | 90 parts by mass |
| Ethylene oxide-modified trimethylolpropane triacrylate (V#360, from Osaka Organic Chemical Industry Co., Ltd.) | 10 parts by mass |
| Photo-polymerization initiator A | 3.0 parts by mass |
| Fluorine-containing compound A | 0.8 parts by mass |
| Methyl ethyl ketone | 588 parts by mass |

The optically anisotropic layers obtained in Examples 2 to 11 were analyzed by X-ray diffractometry in the same way as Example 1. Peaks indicating a laminar structure were observed at around $2\theta=2°$, which were confirmed to be diffracted light attributable to orderliness of the smectic phase.

Example 21

<Manufacture of Alignment Film 21>

Using the triacetyl cellulose transparent support manufactured in Example 1, a coating liquid for forming a photo-aligned film 21, having the composition below, was coated using a wire bar coater. The coating was dried under a hot air of 60° C. for 60 seconds, and further under a hot air of 100° C. for 120 seconds, to thereby form the photo-aligned film 21.

| Composition of Coating Liquid for Forming Alignment Film 21 | |
|---|---|
| Photo-alignable material 21, shown below | 1.0 part by mass |
| Butoxyethanol | 33 parts by mass |
| Propylene glycol monomethyl ether | 33 parts by mass |
| Water | 33 parts by mass |

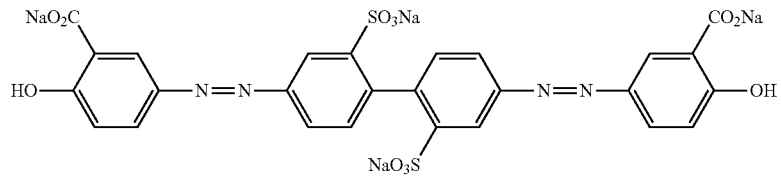

Photo-alignable material 21

<Manufacture of Optically Anisotropic Layer 21>

Next, a coating liquid 21 for forming optically anisotropic layer, having the composition below, was prepared. The coating liquid was coated over the surface of a slide glass, and observed under heating under a polarizing microscope. It was observed that a clear smectic-A phase appeared at 148° C., changed to the nematic phase at 183° C., and further changed to the isotropic phase at 255° C.

| Composition of Coating Liquid 21 for Forming Optically Anisotropic Layer | |
| --- | --- |
| Smectic liquid crystalline compound Sm-21 | 10 parts by mass |
| Photo-polymerization initiator (Irgacure 819, from BASF) | 3.0 parts by mass |
| Fluorine-containing Compound A shown above | 0.8 parts by mass |
| Chloroform | 990 parts by mass |

II-2-2

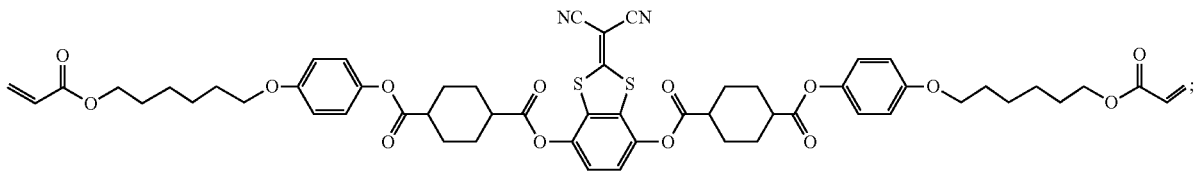

Smectic liquid crystalline compound Sm-21

The thus manufactured photo-aligned film 21 was vertically irradiated under air with a 160 mW/cm² air-cooled metal halide lamp (from Eye Graphics Co., Ltd.). The irradiation was implemented through a wire grid polarizer (ProFlux PPL02, from Moxtek, Inc.) which was set in parallel with the plane of photo-aligned film 21. Illuminance of the UV light used here was set to 100 mW/cm² in the UV-A region (cumulative in the range from 380 nm to 320 nm), and the dose was set to 1000 mJ/cm² in the UV-A region.

Next, the coating liquid 21 for forming optically anisotropic layer was coated over the photo-aligned film using a bar coater. The coating was ripened at the surface temperature of 200° C. for 60 seconds, then cooled down to 175° C., irradiated under air with UV light of 1000 mJ/cm² using a 70 mW/cm² air-cooled metal halide lamp (from Eye Graphics Co., Ltd.) so as to fix the state of alignment, to thereby manufacture the optically anisotropic layer 21. In the thus formed optically anisotropic layer 21, the rod-like liquid crystalline compound Sm-21 was found to align so as to direct the slow axis orthogonal to the direction of irradiation of polarized light. The thickness d of the optically anisotropic layer was found to be 2 μm. The incident angle dependence of Re and the tilt angle of the optical axis were measured using an automatic birefringence meter (KOBRA-21ADH, from Oji Scientific Co., Ltd.). Results of measurement at 550 nm include Re=130 nm, Rth=65 nm, Re(550)/d=0.065, Re(450)/Re(550)=0.80, Re(650)/Re(550)=1.05, and tilt angle of optical axis=0°. Contrast of the optically anisotropic layer was found to be 140,000.

Example 22

<Manufacture of Optically Anisotropic Layer 22>

Over the photo-aligned film 21 which was photo-aligned in the same way as Example 21, the coating liquid 21 for forming optically anisotropic layer used in Example 21 was coated using a bar coater, so that the thickness d was 2.1 μm. The coating was ripened at the surface temperature of 200° C. for 60 seconds, kept at 200° C., and irradiated under air with UV light of 1000 mJ/cm² using a 70 mW/cm² air-cooled metal halide lamp (from Eye Graphics Co., Ltd.) so as to fix the state of alignment, to thereby form an optically anisotropic layer 22. In the thus formed optically anisotropic layer 22, the rod-like liquid crystalline compound Sm-21 was found to align while directing the slow axis orthogonal to the direction of irradiation of polarized light. The thickness d of the optically anisotropic layer was 2.1 μm. The incident angle dependence of Re and the tilt angle of the optical axis were measured using an automatic birefringence meter (KOBRA-21ADH, from Oji Scientific Co., Ltd.). Results of measurement at 550 nm include Re=138 nm, Rth=69 nm, Re(550)/d=0.065, Re(450)/Re(550)=0.80, Re(650)/Re(550)=1.05, and the tilt angle of optical axis=0°. Contrast of the optically anisotropic layer was found to be 50,000.

Example 23

<Manufacture of Optically Anisotropic Layer 23>

The photo-aligned film 21 manufactured in Example 21 was irradiated under air with UV light using a 160 mW/cm² air-cooled metal halide lamp (from Eye Graphics Co., Ltd.). In the irradiation, the lamp was set at an angle of 15° to the plane of the photo-aligned film 21. Illuminance of the UV light used here was set to 100 mW/cm² in the UV-A region (cumulative in the range from 380 nm to 320 nm), and the dose was set to 1000 mJ/cm² in the UV-A region.

The coating liquid 21 for forming the optically anisotropic layer used in Example 21 was coated using a bar coater so as to attain a thickness of 2.0 μm. The coating was ripened at a surface temperature of 200° C. for 60 seconds, then cooled down to 175° C., and irradiated under air with UV light of 1000 mJ/cm² using a 70 mW/cm² air-cooled metal halide lamp (from Eye Graphics Co., Ltd.) so as to fix the state of alignment, to thereby form an optically anisotropic layer 23. In the thus formed optically anisotropic layer 23, the rod-like liquid crystalline compound Sm-21 was found to align so as to direct the slow axis in parallel with the direction of irradiation of light. The thickness d of the optically anisotropic layer was 2.0 μm. The incident angle dependence of Re and the tilt angle of the optical axis were measured using an automatic birefringence meter (KOBRA-21ADH, from Oji Scientific Co., Ltd.). Results of measurement at 550 nm include Re=130 nm, Rth=65 nm, Re(550)/ d=0.065, Re(450)/Re(550)=0.80, Re(650)/Re(550)=1.05, and tilt angle of optical axis=5°. Contrast of the optically anisotropic layer was found to be 120,000.

Example 24

<Manufacture of Optically Anisotropic Layer 24>

The smectic liquid crystalline compound Sm-21 contained in the coating liquid 21 for forming an optically anisotropic layer used in Example 21, was changed to Sm-24, to manufacture a coating liquid 24 for forming an optically anisotropic layer. The coating liquid was coated over the surface of a slide glass, and observed under heating under a polarizing microscope. It was observed that a clear smectic-A phase appeared at 124° C., changed to the nematic phase at 164° C., and further changed to the isotropic phase at 247° C.

II-2-1

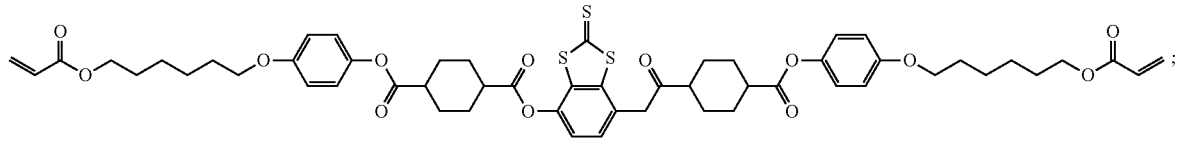

Smectic liquid crystalline compound Sm-24

Over the photo-aligned film 21 which was photo-aligned in the same way as Example 21, the coating liquid 24 for forming optically anisotropic layer was coated using a bar coater, so that the thickness d was 2.0 μm. The coating was ripened at the surface temperature of 200° C. for 60 seconds, then cooled down to 155° C., and irradiated under air with UV light of 1000 mJ/cm² using a 70 mW/cm² air-cooled metal halide lamp (from Eye Graphics Co., Ltd.) so as to fix the state of alignment, to thereby form an optically anisotropic layer 24. In the thus formed optically anisotropic layer 24, the rod-like liquid crystalline compound Sm-24 was found to align while directing the slow axis orthogonal to the direction of irradiation of polarized light. The thickness d of the optically anisotropic layer was 2.0 μm. The incident angle dependence of Re and the tilt angle of the optical axis were measured using an automatic birefringence meter (KOBRA-21ADH, from Oji Scientific Co., Ltd.). Results of measurement at 550 nm include Re=130 nm, Rth=65 nm, Re(550)/d=0.065, Re(450)/Re(550)=1.00, Re(650)/Re(550)=0.99, and tilt angle of optical axis=0°. Contrast of the optically anisotropic layer was found to be 140,000.

Example 25

<Manufacture of Optically Anisotropic Layer 25>

The smectic liquid crystalline compound Sm-24 contained in the coating liquid 24 for forming an optically anisotropic layer used in Example 24, was changed to Sm-25, to manufacture a coating liquid 25 for forming an optically anisotropic layer. The coating liquid was coated over the surface of a slide glass, and observed under heating under a polarizing microscope. It was observed that a clear smectic-A phase appeared at 160° C., changed to the nematic phase at 169° C., and further changed to the isotropic phase at 224° C.

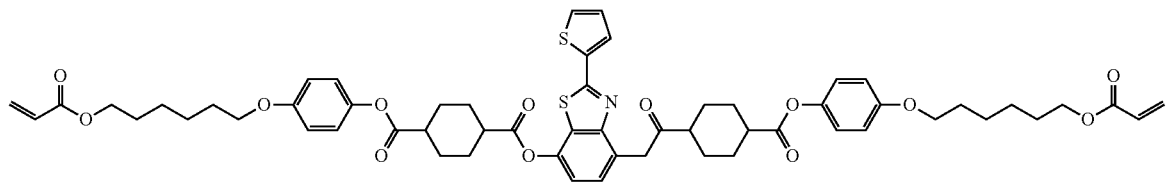

Smectic liquid crystalline compound Sm-25

Over the photo-aligned film 21 which was photo-aligned in the same way as Example 21, the coating liquid 25 for forming optically anisotropic layer was coated using a bar coater, so that the thickness d was 2.0 μm. The coating was ripened at the surface temperature of 200° C. for 60 seconds, then cooled down to 160° C., and irradiated under air with UV light of 1000 mJ/cm² using a 70 mW/cm² air-cooled metal halide lamp (from Eye Graphics Co., Ltd.) so as to fix the state of alignment, to thereby form an optically anisotropic layer 25. In the thus formed optically anisotropic layer 25, the rod-like liquid crystalline compound Sm-25 was

| Composition of Coating Liquid 26 for Forming Optically Anisotropic Layer | |
|---|---|
| Smectic liquid crystalline compound Sm-26-1 | 57.5 parts by mass |
| Smectic liquid crystalline compound Sm-26-2 | 30 parts by mass |
| Rod-like compound RL-26 | 12.5 parts by mass |
| Photo-polymerization initiator (Irgacure 819, from BASF) | 6.0 parts by mass |
| Fluorine-containing compound A shown above | 0.85 parts by mass |
| Chloroform | 600 parts by mass |

II-2-3

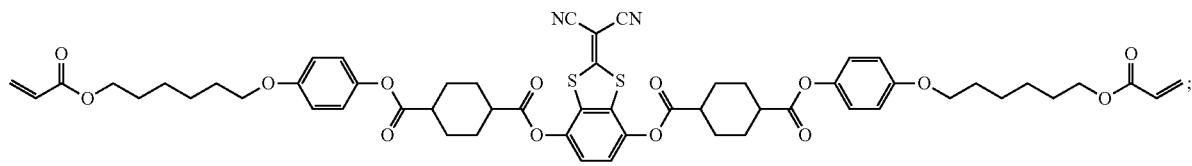

Smectic liquid crystalline compound Sm-26-1

II-2-4

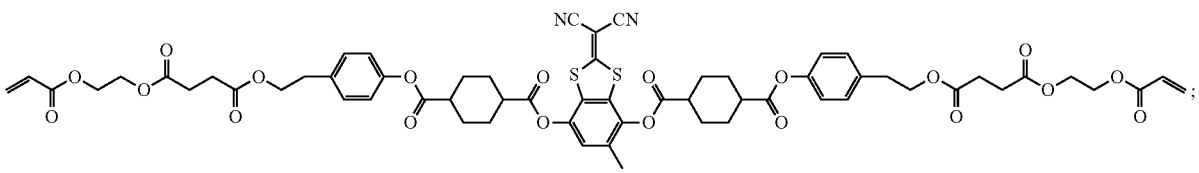

Smectic liquid crystalline compound Sm-26-2

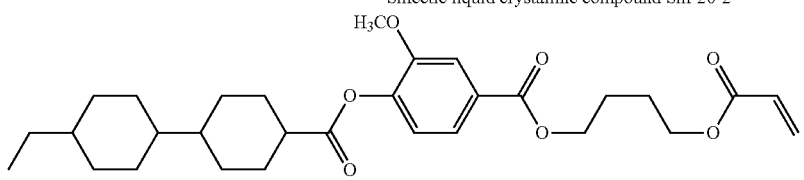

Rod-like compound RL-26 found to align while directing the slow axis orthogonal to the direction of irradiation of polarized light. The thickness d of the optically anisotropic layer was 2.0 μm. The incident angle dependence of Re and the tilt angle of the optical axis were measured using an automatic birefringence meter (KOBRA-21ADH, from Oji Scientific Co., Ltd.). Results of measurement at 550 nm include Re=130 nm, Rth=65 nm, Re(550)/d=0.065, Re(450)/Re(550)=0.81, Re(650)/Re(550)=1.03, and tilt angle of optical axis=0°. Contrast of the optically anisotropic layer was found to be 120,000.

Example 26

<Manufacture of Optically Anisotropic Layer 26>

The coating liquid 21 for forming the optically anisotropic layer used in Example 21 was changed to a coating liquid 26 for forming an optically anisotropic layer having the composition below. The coating liquid was coated over a slide glass, and observed under heating under a polarizing microscope. It was observed that a clear smectic-A phase appeared in the range from room temperature to 73° C., and the nematic phase appeared in the range from 73° C. to 128° C.

The surface of a support TD80UL (from Fujifilm Corporation) was saponified with an alkali. The support was immersed in a 1.5 N aqueous sodium hydroxide solution at 55° C. for 2 minutes, washed in a water washing bath at room temperature, and neutralized at 30° C. using a 0.1 N sulfuric acid. The support was again washed in the water washing bath at room temperature, and dried under hot air of 100° C.

Next, a rolled polyvinyl alcohol film of 80 μm thick was continuously stretched 5 fold in aqueous iodine solution, dried to obtain a polarizer of 20 μm thick, and bonded to TD80UL saponified above using an aqueous solution of polyvinyl alcohol-based adhesive.

On the other surface, the coating liquid for forming the photo-aligned film 21, prepared in Example 21, was coated using a wire bar coater. The coating was dried under hot air of 60° C. for 60 seconds, and further under hot air of 80° C. for 120 seconds, to manufacture the photo-aligned film 21. The thus manufactured photo-aligned film 21 was vertically irradiated under air with UV light using a 160 mW/cm² air-cooled metal halide lamp (from Eye Graphics Co., Ltd.). The irradiation was implemented through a wire grid polarizer (ProFlux PPL02, from Moxtek, Inc.), which was set in parallel with the plane of photo-aligned film 21, and so as to align the transmission axis of the wire grid polarizer in parallel with the absorption axis of the polarizer. Illuminance of the UV light used here was set to 100 mW/cm² in the UV-A region (cumulative in the range from 380 nm to 320 nm), and the dose was set to 1000 mJ/cm² in the UV-A region. In this way, a laminate 26 in which the linear polarizer and the photo-aligned film 21 are kept in direct contact, was manufactured.

Next, on the photo-aligned surface, the coating liquid 26 for forming the optically anisotropic layer was coated using a bar coater. The coating was ripened at a surface temperature of 90° C. for 30 seconds, then cooled down to 60° C., and irradiated under air with UV light of 1000 mJ/cm² using a 70 mW/cm² air-cooled metal halide lamp (from Eye Graphics Co., Ltd.) so as to fix the state of alignment, to thereby form the optically anisotropic layer 26. In the thus formed optically anisotropic layer 26, the rod-like liquid crystalline compounds Sm-26-1 and Sm-26-2 were found to align, while directing the slow axes orthogonal to the direction of irradiation of polarized light (that is, orthogonal to the absorption axis of the polarizer). The thickness d of the optically anisotropic layer was 2.8 μm. The incident angle dependence of Re and the tilt angle of the optical axis were measured using an automatic birefringence meter (KOBRA-21ADH, from Oji Scientific Co., Ltd.). Results of measurement at 550 nm include Re=140 nm, Rth=70 nm, Re(550)/d=0.050, Re(450)/Re(550)=0.90, Re(650)/Re(550)=1.00, and tilt angle of optical axis=0°. Contrast of the optically anisotropic layer was found to be 140,000.

Example 27

<Manufacture of Optically Anisotropic Layer 27>
<Manufacture of Orthogonal Alignment Film 27>

Over the other surface of the linear polarizer manufactured in Example 26, a coating liquid for forming an orthogonal alignment film 27, having the composition below, was continuously coated using a #8 wire bar. The coating was dried under air of 60° C. for 60 seconds, and further under air of 80° C. for 120 seconds, to thereby manufacture the orthogonal alignment film 27. The thus manufactured orthogonal alignment film 27 was rubbed. The rubbing was implemented so that the axis of rubbing lies orthogonal to the absorption axis of the polarizer. In this way, the laminate 27 in which the linear polarizer and the orthogonal alignment film 27 are kept in direct contact, was formed.

| Composition of Coating Liquid for Forming Alignment Film 27 | |
|---|---|
| Material of orthogonal alignment film shown below | 2.4 parts by mass |
| Isopropanol | 1.6 parts by mass |
| Methanol | 36 parts by mass |
| Water | 60 parts by mass |

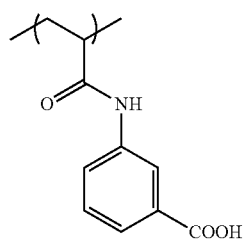

Next, over the rubbed surface, the coating liquid 26 for forming the optically anisotropic layer was coated using a bar coater. The coating was ripened at a surface temperature of 90° C. for 30 seconds, then cooled down to 60° C., and irradiated under air with UV light of 1000 mJ/cm² using a 70 mW/cm² air-cooled metal halide lamp (from Eye Graphics Co., Ltd.) so as to fix the state of alignment, to thereby form the optically anisotropic layer 27. In the thus formed optically anisotropic layer 26, the rod-like liquid crystalline compounds Sm-26-1 and Sm-26-2 were found to align while directing the slow axes in parallel with the direction of rubbing (that is, orthogonal to the absorption axis of the polarizer). The thickness d of the optically anisotropic layer was 2.8 μm. The incident angle dependence of Re and the tilt angle of the optical axis were measured using an automatic birefringence meter (KOBRA-21ADH, from Oji Scientific Co., Ltd.). Results of measurement at 550 nm include Re=140 nm, Rth=70 nm, Re(550)/d=0.050, Re(450)/Re(550)=0.90, Re(650)/Re(550)=1.00, and tilt angle of optical axis=0°. Contrast of the optically anisotropic layer was found to be 50,000.

Also the optically anisotropic layer manufactured in Examples 21 to 27 were analyzed in the same way as Example 1 by X-ray diffractometry. Peaks indicating a laminar structure were observed at around 2θ=2°, which were confirmed to be diffracted light derived from orderliness of the smectic phase. In contrast, the optically anisotropic layer manufactured in Example 22 showed a somewhat broad peak which is derived from a cybotactic phase (intermediate phase between smectic phase and nematic phase).

Comparative Example 2

An optically anisotropic layer was manufactured in the same way as Example 1, except that the temperature of UV irradiation was set to 90° C.

The thus obtained optically anisotropic layer was analyzed by X-ray diffractometry in the same way as Example 1. No peak was found in the range of 2θ=1.5 to 3, although the peak has been observed in Example 1. Since the polymerizable composition has a glass transition temperature of 82° C. between the smectic phase and the nematic phase, the polymerizable composition stays in the nematic phase at 90° C. Since the nematic phase can show only a low orderliness even if fixed in that state, no diffraction peak was detected. In Comparative Example 2, no cybostatic phase was observed, suggesting that a high-contrast film will not be produced.

Comparative Example 3

An optically anisotropic layer was manufactured in the same way as Example 1, except that the coating liquid A for forming the optically anisotropic layer was changed to a coating liquid I for forming optically anisotropic layer, that the ripening temperature was set to 90° C., and that the temperature of UV irradiation was set to 70° C. The coating liquid I for forming optically anisotropic layer was found to have a phase transition temperature between the smectic-A phase and the nematic phase of 75° C.

| Composition of Coating Liquid I for Forming Optically Anisotropic Layer | |
|---|---|
| Smectic liquid crystalline compound Sm-5 | 55 parts by mass |
| Rod-like compound RL-4 | 45 parts by mass |
| Photo-polymerization initiator (Irgacure 907, from BASF) | 3.0 parts by mass |
| Fluorine-containing compound A | 0.8 parts by mass |
| Methyl ethyl ketone | 588 parts by mass |

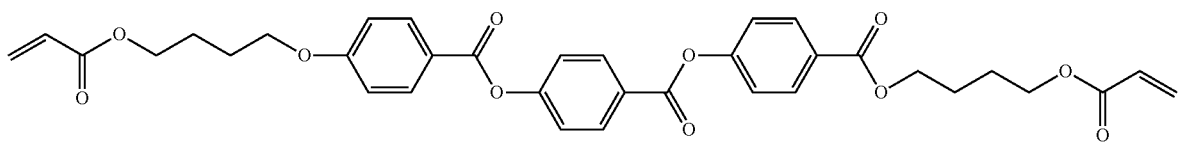

Smectic liquid crystalline compound Sm-5

Comparative Example 4

An optically anisotropic layer was manufactured in the same way as Example 1, except that the coating liquid A for forming the optically anisotropic layer was changed to a coating liquid J for forming optically anisotropic layer, that the ripening temperature was set to 70° C., and that the temperature of UV irradiation was set to 70° C. The coating liquid J for forming optically anisotropic layer showed no smectic phase, and showed a phase transition temperature between the nematic phase and the isotropic phase of 110° C. In Comparative Example 4, no cybostatic phase was observed, suggesting that a high-contrast film will not be produced.

| Composition of Coating Liquid J for Forming Optically Anisotropic Layer | |
|---|---|
| Rod-like compound RL-4 | 80 parts by mass |
| Rod-like compound RL-5 | 20 parts by mass |
| Photo-polymerization initiator (Irgacure 907, from BASF) | 3.0 parts by mass |
| Fluorine-containing compound A | 0.8 parts by mass |
| Methyl ethyl ketone | 588 parts by mass |

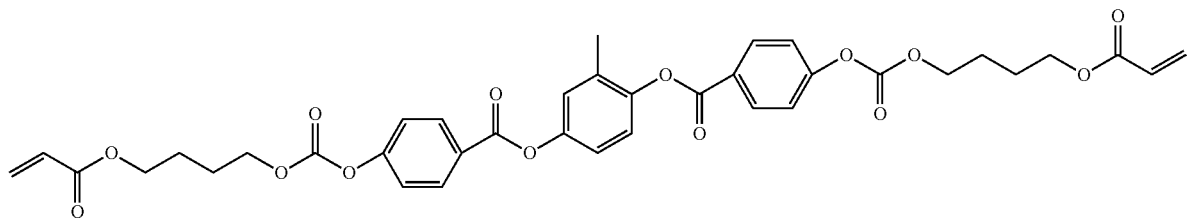

Rod-like compound RL-5

Comparative Example 41

An optically anisotropic layer 41 was manufactured in the same way as Example 24, except that the photo-aligned film was changed to the alignment film A used in Example 1 and rubbed. The thickness of the optically anisotropic layer was 2.0 μm. The incident angle dependence of Re and the tilt angle of the optical axis were measured using an automatic birefringence meter (KOBRA-21ADH, from Oji Scientific Co., Ltd.). Results of measurement at 550 nm include Re=110 nm, Rth=75 nm, Re(550)/d=0.055, Re(450)/Re(550)=1.00, Re(650)/Re(550)=0.99, and tilt angle of optical axis-12°. Contrast of the optically anisotropic layer was found to be 7,000.

Comparative Example 42

An optically anisotropic layer 42 was manufactured in the same way as Example 25, except that the photo-aligned film was changed to the alignment film A used in Example 1 and rubbed. The thickness of the optically anisotropic layer was 2.0 μm. The incident angle dependence of Re and the tilt angle of the optical axis were measured using an automatic birefringence meter (KOBRA-21ADH, from Oji Scientific Co., Ltd.). Results of measurement at 550 nm include Re=108 nm, Rth=78 nm, Re(550)/d=0.054, Re(450)/Re(550)=0.81, Re(650)/Re(550)=1.03, and tilt angle of optical axis=14°. Contrast of the optically anisotropic layer was found to be 5,000.

[Evaluation Using Liquid Crystal Display Device]

<Manufacture of Positive C-Plate>

The modified polyvinyl alcohol used for forming the alignment film A was changed to a commercially available unmodified polyvinyl alcohol PVA103 (from Kuraray Co., Ltd.), and an alignment film C was manufactured in the same way as Example 1 on a tentative support. A coating K having the composition below was coated thereon, the coating was ripened at 60° C. for 60 seconds, and irradiated under air with UV light of 1000 mJ/cm² using a 70 mW/cm² air-cooled metal halide lamp (from Eye Graphics Co., Ltd.) so as to fix the state of alignment. The polymerizable rod-like liquid crystal compound was thus aligned vertically, to give a positive C-plate. Results of measurement at 550 nm include Re=0 nm, Rth=−115 nm, Rth(450)/Rth(550)=1.07, and Rth(650)/Rth(550)=0.95.

| Composition of Coating Liquid K for Forming Optically Anisotropic Layer | |
| --- | --- |
| Liquid crystalline compound B01 | 80 parts by mass |
| Liquid crystalline compound B02 | 20 parts by mass |
| Vertical alignment agent (S01) | 1 part by mass |
| Vertical alignment agent (S02) | 0.5 parts by mass |
| Ethylene oxide-modified trimethylolpropane triacrylate (V#360, from Osaka Organic Chemical Industry Ltd.) | 8 parts by mass |
| Irgacure 907 (from BASF) | 3 parts by mass |
| Kayacure DETX (from Nippon Kayaku Co., Ltd.) | 1 part by mass |
| B03 | 0.4 parts by mass |
| Methyl ethyl ketone | 170 parts by mass |
| Cyclohexanone | 30 parts by mass |

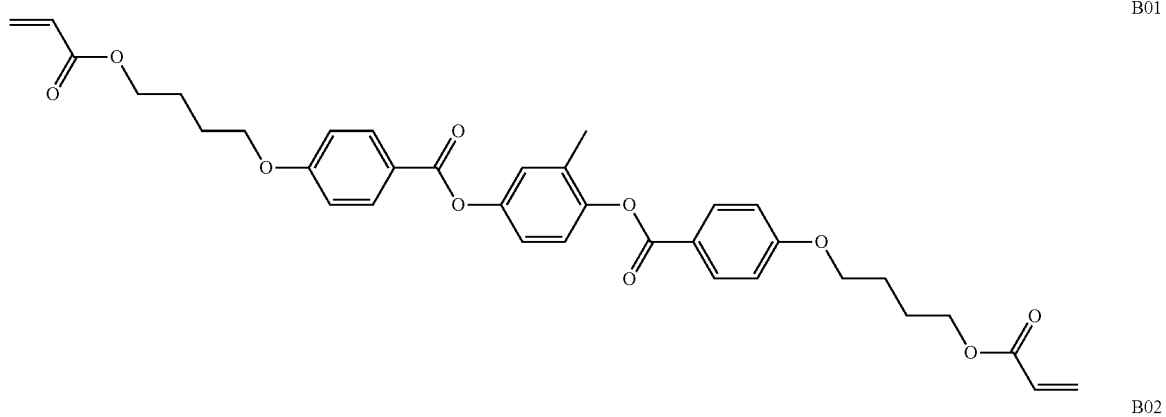

B01

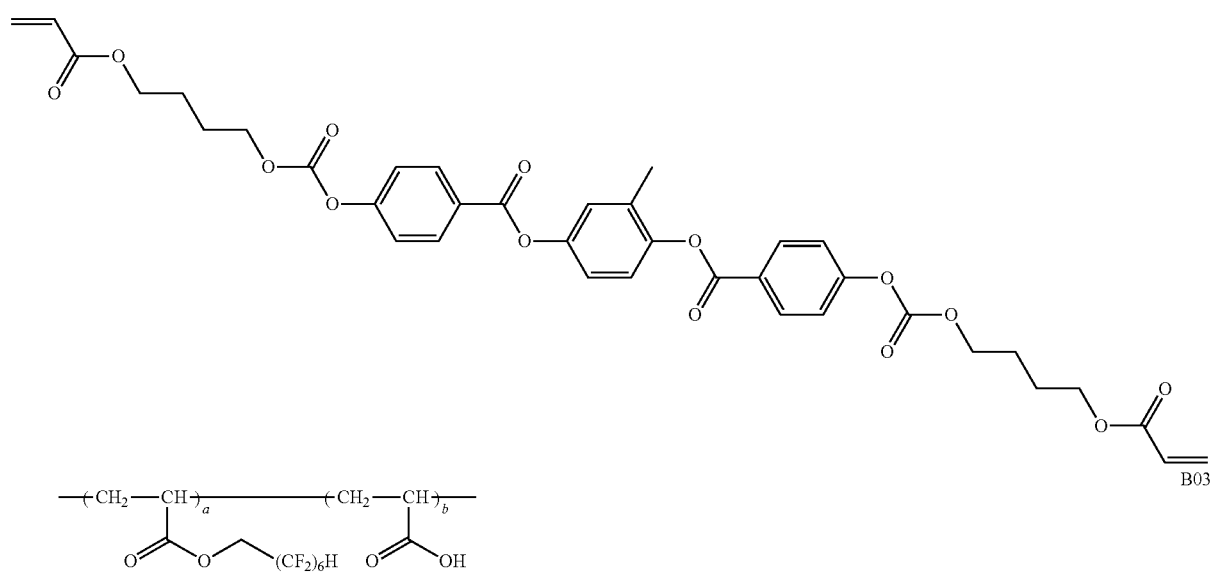

B02

B03

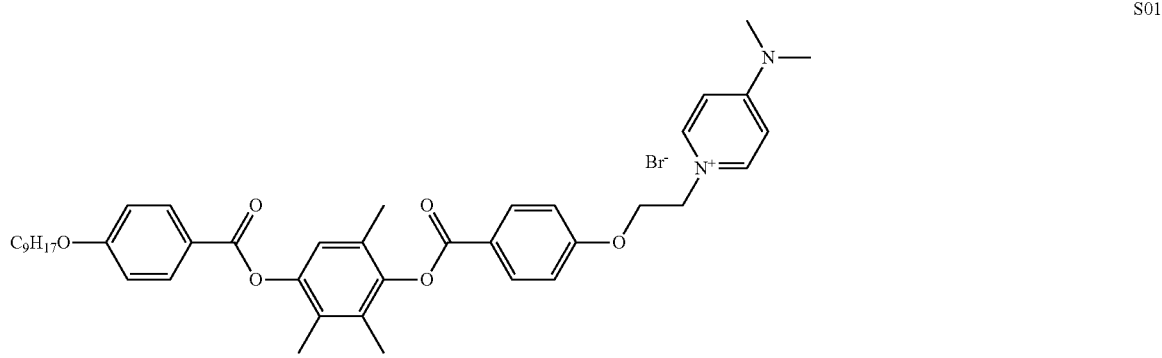

S01

-continued

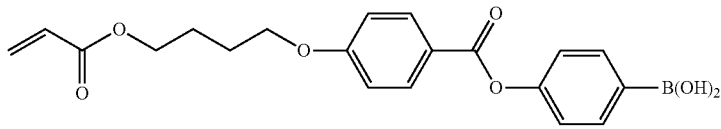

S02

<Bonding of Optically Anisotropic Layer and Positive C-Plate>

To the coated surface of the optically anisotropic layer manufactured in Example 1, the positive C-plate was bonded so as to face the coated surface thereof to the optically anisotropic layer by using a tacky agent. After the bonding, the tentative support was peeled off to produce a laminated optical film.

<Manufacture of Polarizing Plate>

The surface of a support TD80UL (from Fujifilm Corporation) was saponified with an alkali. The support was immersed in a 1.5 N aqueous sodium hydroxide solution at 55° C. for 2 minutes, washed in a water washing bath at room temperature, and neutralized at 30° C. using a 0.1 N sulfuric acid. The support was again washed in the water washing bath at room temperature, and dried under hot air of 100° C.

Next, a rolled polyvinyl alcohol film of 80 μm thick was continuously stretched 5 fold in aqueous iodine solution, and then dried to obtain a polarizer of 20 μm thick.

Onto the other surface, the surface of the above-prepared laminated optical film, which is the opposite surface of the coated surface, was bonded sous to the polarizer was sandwiched. In this way, obtained was a polarizing plate, in which TD80UL and the laminated optical film serve as protective films for the polarizer. An aqueous solution of a polyvinyl alcohol-based adhesive was used for the bonding. In the process of bonding, the optically anisotropic layer and the polarizer were laminated so that the slow axis of the optically anisotropic layer is orthogonal to the absorption axis of the polarizer.

Example 12

An optically anisotropic layer was manufactured in the same way as Example 1, except that the modified polyvinyl alcohol in the coating liquid for forming the alignment film A was changed to a commercially available polyvinyl alcohol PVA103 (from Kuraray Co., Ltd.). The obtained optically anisotropic layer was analyzed by X-ray diffractometry in the same way as Example 1. A peak indicating a laminar structure was observed at around 2θ=2°, which was confirmed to be diffracted light attributable to orderliness of the smectic phase.

The surface of a support TD80UL (from Fujifilm Corporation) was saponified with an alkali. The support was immersed in a 1.5 N aqueous sodium hydroxide solution at 55° C. for 2 minutes, washed in a water washing bath at room temperature, and neutralized at 30° C. using a 0.1 N sulfuric acid. The support was again washed in the water washing bath at room temperature, and dried under hot air of 100° C. Next, a rolled polyvinyl alcohol film of 80 μm thick was continuously stretched 5 fold in aqueous iodine solution, and then dried to obtain a polarizer of 20 μm thick.

Onto the other surface, the coated surface of the optically anisotropic layer, which was prepared by changing the support thereof from the cellulose acylate film to the tentative support, was bonded so that the polarizer was sandwiched between TD80UL and the optically anisotropic layer. In the process of bonding, the optically anisotropic layer and the polarizer were laminated so that the slow axis of the optically anisotropic layer was orthogonal to the absorption axis of the polarizer. The tentative support for forming the optically anisotropic layer was peeled from the polarizing plate, and the coated surface of the positive C-plate was bonded to the optically anisotropic layer of the polarizing plate using a tacky agent, the tentative support for forming the positive C-plate was peeled to thereby obtain a polarizing plate.

Example 13

The surface of a support TD80UL (from Fujifilm Corporation) was saponified with an alkali. The support was immersed in a 1.5 N aqueous sodium hydroxide solution at 55° C. for 2 minutes, washed in a water washing bath at room temperature, and neutralized at 30° C. using a 0.1 N sulfuric acid. The support was again washed in the water washing bath at room temperature, and dried under hot air of 100° C.

Next, a rolled polyvinyl alcohol film of 80 μm thick was continuously stretched 5 fold in aqueous iodine solution, and then dried to obtain a polarizer of 20 μm thick. The polarizer was then bonded to TD80UL, to thereby obtain a polarizing plate with one surface thereof remained exposed. The polarizer was rubbed in the direction orthogonal to the absorption axis. Using the obtained product as an alignment film, a polarizing plate with optically anisotropic layer was manufactured in the same way as Example 1. The optically anisotropic layer is analyzed again by X-ray diffractometry in the same way as in Example 1. A peak indicating a laminar structure was observed at around 2θ=2°, which was confirmed to be diffracted light attributable to orderliness of the smectic phase. To the optically anisotropic layer of the polarizing plate with optically anisotropic layer, the above-described positive C-plate was bonded, and the tentative support for forming the positive C-plate was then peeled to thereby obtain a polarizing plate with the laminated optically anisotropic layer.

<Manufacture of Liquid Crystal Display Device 1>

A polarizing plate on the viewer's side was peeled off from a liquid crystal cell of iPad (from Apple Inc.), and the resultant cell was used as an IPS-mode liquid crystal cell.

In place of the peeled-off polarizing plate, the above-manufactured polarizing plate with the laminated optical film was bonded to the liquid crystal cell, to thereby manufacture a liquid crystal display device of Example 1. In the process of bonding, the absorption axis of the polarizing plate was aligned normal to the optical axis of a liquid crystal layer in the liquid crystal cell, when observed in the direction normal to the substrate surface of the liquid crystal cell.

Also in Examples 2 to 13 and Comparative Examples 2 to 4, bonding with the positive C-plate, manufacture of the polarizing plate, and manufacture of the liquid crystal display device were implemented in the same way as Example 1, except that the optically anisotropic layer was changed.

In Comparative Example 1, a liquid crystal display device was manufactured in the same way as Example 1, except that only the cellulose acylate film manufactured in Example 1 was used in place of the laminated optical film.

<Manufacture of Liquid Crystal Display Device 2>

A polarizing plate on the viewer's side was peeled off from a liquid crystal cell of iPad (a model with a photo-aligned film, from Apple Inc.), and the resultant cell was used as an IPS-mode liquid crystal cell with photo-aligned film. The liquid crystal cell was found to have a pre-tilt angle of 0°.

Also in Examples 21 to 27, and Comparative Examples 41 and 42, bonding with the positive C-plate, manufacture of the polarizing plate, and manufacture of the liquid crystal display device were implemented in the same way as Example 1, except that the optically anisotropic layer was changed.

<Evaluation 1>

Display performance was measured using a commercially available software Ezcom (from ELDIM) for analyzing viewing angle and chromaticity of liquid crystal display device. Back light was a commercially available one incorporated in a liquid crystal display unit of iPad (from Apple Inc.). For the measurement, the liquid crystal cell bonded with the polarizing plate was set so as to direct the optically anisotropic layer opposite to the back light. Results are summarized in Table 4 below.

(Contrast of Panel)

Luminance (Yw) in the vertical direction on the panel in the state of white display, and luminance (Yb) in the vertical direction on the panel in the state of black display were measured, contrast (Yw/Yb) in the vertical direction of the panel was calculated and defined as front contrast, and was evaluated according to the criteria below:

A: Front contrast is 95% or larger, in reference to Comparative Example 1
B: Front contrast is 85% or larger and smaller than 95%, in reference to Comparative Example 1
C: Front contrast is 75% or larger and smaller than 85%, in reference to Comparative Example 1
D: Front contrast is smaller than 75%, in reference to Comparative Example 1

(Leakage of Light in Oblique View)

Black luminance (Cd/m$^2$) was measured at higher angles (azimuth=0 to 180°, 5° intervals) and at lower angles (azimuth=180 to 360°, 5° intervals), and the respective maximum value of black luminance was averaged (maximum luminance).

The smaller the value, the lesser the leakage of light in the black display. The maximum luminance was evaluated according to the 4-rank criteria A to D below:

A: maximum luminance≤1;
B: 1<maximum luminance≤2;
C: 2<maximum luminance≤5; and
D: 10<maximum luminance.

(Viewing Angle Dependence of Hue)

Chromaticity of the liquid crystal display device in the state of black display was measured in a photo-dark room using a measuring instrument (EZ-Contrast XL88, from ELDIM). More specifically, chromaticity (u', v') was measured at a polar angle of 60° and an azimuth ranged from 0° to 345° at 15° intervals, a minimum value (u' min, v' min) and a maximum value (u' max, v' max) of the measured chromaticity values (u', v') were extracted, and hue change Δ(u', v') given by the equation below was evaluated.

$$\Delta(u',v')=\sqrt{((u'\max-u'\min)^2+(v'\max-v'\min)^2)}$$

The smaller the value, the better the viewing angle dependence of hue. Results were evaluated according to the 4-rank criteria A to D below:

A: Δ(u', v')<0.12
B: 0.12≤Δ(u', v')<0.15
C: 0.15≤Δ(u', v')<0.18
D: 0.18≤Δ(u', v')

(Amount of Residual Monomer)

The optically anisotropic layer, together with the support, was extracted with chloroform for 24 hours, the extract was allowed to pass through a filter (Millipore Millex-FG, 0.2 μm), the amount of residual smectic liquid crystalline compound was quantified by HPLC under the conditions below, and a ratio of the residual unpolymerized smectic liquid crystalline compound, to the amount of coating was determined.

Column: TSK-GEL ODS-80Ts 2.0 mm ID×150 mm,
Gradient condition: H$_2$O (0.1% AA, TEA)/MeOH (0.1% AA, TEA)=90/10→0/100 (20→50 min),
Run time: 50 min
Post run: 15 min
Flow rate: 0.2 mL/min,
Column temperature: 40° C.,
Injection volume: 5 mL,
Monitoring wavelength: 254 nm <Evaluation 2>

Also display performances of the liquid crystal display device manufactured in "Manufacture of Liquid Crystal Display Device 2" were measured using a commercially available software EZCom (from ELDIM) for analyzing viewing angle and chromaticity of liquid crystal in the same way as in Evaluation 1. Back light was a commercially available one incorporated in a liquid crystal display unit of iPad (a model with a photo-aligned film, from Apple Inc.). For the measurement, the liquid crystal cell bonded with the polarizing plate was set so as to direct the optically anisotropic layer opposite to the back light. Results are summarized in Table 5 below.

TABLE 4

| | | Optically anisotropic layer of the invention | | | |
|---|---|---|---|---|---|
| | Average tilt angle | Re(nm) of optically anisotropic layer | Amount of residual monomer | X-ray diffraction pattern showing layer construction | Contrast of panel | Leakage of light in oblique view |
| Example 1 | 2° | 128 | <3% | Yes | A | A |
| Example 2 | 5° | 128 | <3% | Yes | A | B |
| Example 3 | 0° | 128 | 8% | Yes | A | A |
| Example 4 | 2° | 128 | <3% | Yes | A | A |
| Example 5 | 9° | 126 | <3% | Yes | A | A |

TABLE 4-continued

Optically anisotropic layer of the invention

| | Average tilt angle | Re(nm) of optically anisotropic layer | Amount of residual monomer | X-ray diffraction pattern showing layer construction | Contrast of panel | Leakage of light in oblique view |
|---|---|---|---|---|---|---|
| Example 6 | 9° | 126 | <3% | Yes | A | B |
| Example 7 | 5° | 128 | <3% | Yes | A | A |
| Example 8 | 3° | 128 | <3% | Yes | A | A |
| Example 9 | 7° | 127 | <3% | Yes | A | B |
| Example 10 | 2° | 128 | <3% | Yes | A | A |
| Example 11 | 5° | 128 | <3% | Yes | B | B |
| Example 12 | 2° | 128 | <3% | Yes | A | A |
| Example 13 | 2° | 128 | <3% | Yes | A | A |
| Comparative Example 1 | — | — | — | — | A | D |
| Comparative Example 2 | 0° | 128 | <3% | No | C | A |
| Comparative Example 3 | 13° | 125 | <3% | Yes | B | C |
| Comparative Example 4 | 0° | 128 | <3% | No | C | A |

TABLE 5

| | Thickness (μm) | Average tilt angle | Re (nm) | Re (550)/d | Re (450/550) | Re (650/550) | Amount of residual monomer | X-ray diffraction pattern | Contrast of film | Contrast of panel | Leakage of light in oblique view | Viewing angle dependence of hue |
|---|---|---|---|---|---|---|---|---|---|---|---|---|
| Example 21 | 2.0 | 0° | 130 | 0.065 | 0.80 | 1.05 | <3% | Yes | 140,000 | A | A | A |
| Example 22 | 2.1 | 0° | 138 | 0.065 | 0.80 | 1.05 | <3% | No | 50,000 | B | A | A |
| Example 23 | 2.0 | 5° | 130 | 0.065 | 0.80 | 1.05 | <3% | Yes | 120,000 | A | B | A |
| Example 24 | 2.0 | 0° | 130 | 0.065 | 1.00 | 0.99 | <3% | Yes | 140,000 | A | A | A |
| Example 25 | 2.0 | 0° | 130 | 0.65 | 0.81 | 1.03 | <3% | Yes | 120,000 | A | A | A |
| Example 26 | 2.8 | 0° | 140 | 0.050 | 0.90 | 1.00 | <3% | Yes | 140,000 | A | A | A |
| Example 27 | 2.8 | 0° | 140 | 0.050 | 0.90 | 1.00 | <3% | Yes | 50,000 | B | A | A |
| Example 41 | 2.0 | 12° | 110 | 0.055 | 1.00 | 0.99 | <3% | Yes | 7,000 | C | C | B |
| Example 42 | 2.0 | 14° | 108 | 0.054 | 0.81 | 1.03 | <3% | Yes | 5,000 | C | C | A |

Example 31

<Manufacture of Anti-Reflection Plate for Organic EL Display Device>
(Manufacture of Anti-Reflection Plate)

A polarizing plate used here contains a 20 μm thick polarizer which is protected on only one surface thereof with a triacetyl cellulose film (40 μm thick). The unprotected surface of the polarizing plate (surface of the polarizer composed of the stretched polyvinyl alcohol film) was bonded to the optically anisotropic layer manufactured in Example 21 having the positive A-plate laminated with the positive C-plate (where, the thickness of the positive C-plate controlled to attain Rth=−65 nm at 550 nm), using an optically isotropic adhesive, to thereby manufacture an anti-reflection plate (circular polarizing plate) for organic EL display device. The transmission axis of the polarizer was aligned at 45° to the slow axis of the optically anisotropic layer of the positive A-plate.

Examples 32 to 35

Anti-reflection plates were manufactured in the same way as in Example 31, except that, in the manufacture of the optically anisotropic layer in Example 31, the positive A-plate was changed to the positive A-plates manufactured in Examples 22 to 25.

Comparative Examples 51 and 52

Anti-reflection plates were manufactured in the same way as in Example 31, except that, in the manufacture of the optically anisotropic layer in Example 31, the positive A-plate was changed to the positive A-plates manufactured in Examples 41 and 42.

<Mounting onto Organic EL Element and Evaluation of Display Performances>
(Mounting onto Display Device)

A smartphone GALAXY SII (from Samsung) equipped with an organic EL panel was disassembled, the circular polarizing plate was peeled off, and instead each of the anti-reflection plates of Examples 31 to 35 and Comparative Examples 51 and 52 was bonded, to thereby manufacture display devices.

(Evaluation of Display Device)

The thus-manufactured organic EL display devices were evaluated in terms of visibility and definition of display, under bright light.

The display device was operated in the modes of white display, black display, and image display, and reflected light when light of a fluorescent lamp was cast thereon at the front and at a polar angle of 60°, was observed. Definition of display observed at the front and at a polar angle of 60° was evaluated according to the criteria below:

4: No recognizable change in hue (acceptable);
3: Recognizable change in hue, only a slight level (acceptable);
2: Recognizable change in hue, with weak reflected light, no problem in practical use (acceptable); and
1: Recognizable change in hue, with strong reflected light, not acceptable.

TABLE 6

|  | Optically anisotropic layer of the invention (Positive A-plate) | | | | | Positive C-plate | Total | Display performances | |
| --- | --- | --- | --- | --- | --- | --- | --- | --- | --- |
|  | Average tilt angle | Re (nm) | Re (450/550) | Re (650/550) | Rth (nm) | Rth (nm) | Rth (nm) | Front | Polar angle 60° |
| Example 31 | 0° | 130 | 0.80 | 1.05 | 65 | −65 | 0 | 4 | 4 |
| Example 32 | 0° | 138 | 0.80 | 1.05 | 65 | −65 | 0 | 4 | 4 |
| Example 33 | 5° | 130 | 0.80 | 1.05 | 65 | −65 | 0 | 4 | 3 |
| Example 34 | 0° | 130 | 1.00 | 0.99 | 65 | −65 | 0 | 3 | 3 |
| Example 35 | 0° | 130 | 0.81 | 1.03 | 65 | −65 | 0 | 4 | 4 |
| Comparative Example 51 | 12° | 110 | 1.00 | 0.99 | 75 | −65 | 10 | 1 | 1 |
| Comparative Example 52 | 14° | 108 | 0.81 | 1.03 | 78 | −65 | 13 | 1 | 1 |

[Evaluation Using IPS Liquid Crystal Display Device 2]
<Manufacture of Reverse-Wavelength-Dispersion Positive C-Plate>

A reverse-wavelength-dispersion positive C-plate L was manufactured in the same way as the above-described procedures of manufacturing the positive C-plate, except that the coating liquid K for forming the positive C-plate was changed to a coating liquid L for forming reverse-wavelength-dispersion positive C-plate, having the composition below. Results of measurement at 550 nm include Re=0 nm, Rth=−97 nm, Rth(450)/Rth(550)=0.87, and Rth(650)/Rth(550)=1.01.

| Composition of Coating Liquid L for Forming Positive C-Plate with Reverse Wavelength Dispersion | |
| --- | --- |
| Reverse-wavelength-dispersion liquid crystalline compound Sm41-1 | 68 parts by mass |
| Liquid crystalline compound B01 | 25.6 parts by mass |
| Liquid crystalline compound B02 | 6.4 parts by mass |
| Vertical alignment agent (S02) | 0.5 parts by mass |
| Photo-polymerization initiator (Irgacure 819, from BASF) | 3.0 parts by mass |
| B03 | 1.0 part by mass |
| Methyl ethyl ketone | 242 parts by mass |

Example 41

<Bonding of Optically Anisotropic Layer and Positive C-Plate L>

To the coated surface of the optically anisotropic layer manufactured in Example 21, the coated surface of the reverse-wavelength-dispersion positive C-plate L was bonded using a tacky agent. After the bonding, the tentative support was peeled, to thereby manufacture a laminated optical film 41.

<Manufacture of Polarizing Plate 41>

The surface of a support TD80UL (from Fujifilm Corporation) was saponified with an alkali. The support was immersed in a 1.5 N aqueous sodium hydroxide solution at 55° C. for 2 minutes, washed in a water washing bath at room temperature, and neutralized at 30° C. using a 0.1 N sulfuric acid. The support was again washed in the water washing bath at room temperature, and dried under hot air of 100° C.

Next, a rolled polyvinyl alcohol film of 80 μm thick was continuously stretched 5 fold in aqueous iodine solution, and then dried to obtain a polarizer of 20 μm thick.

Onto the other surface, the surface of the above-prepared laminated optical film 41, which is the opposite surface of the coated surface, was bonded so as to hold the polarizer in between. In this way, obtained was a polarizing plate 41, in which TD80UL and the laminated optical film 41 serve as

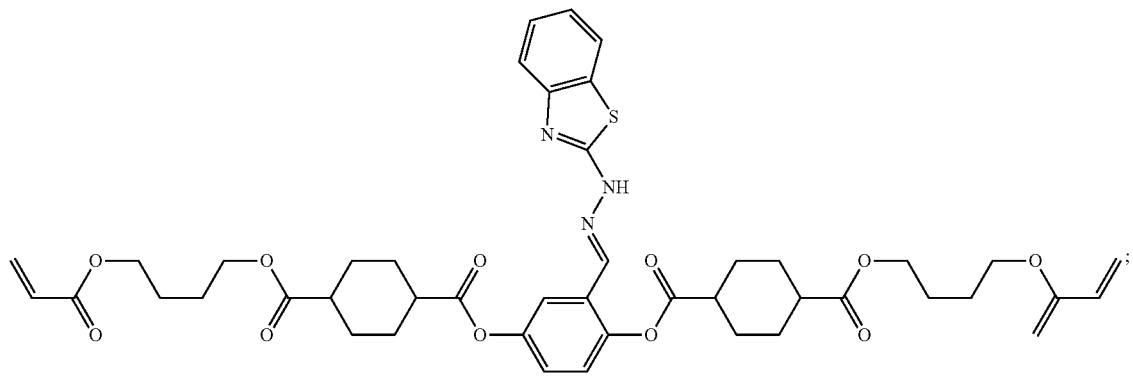

Smectic liquid crystalline compound SM41-1 protective films for the polarizer. An aqueous solution of a polyvinyl alcohol-based adhesive was used for the bonding. In the process of bonding, the optically anisotropic layer and the polarizer were laminated so that the slow axis of the optically anisotropic layer is orthogonal to the absorption axis of the polarizer.

<Manufacture of IPS Liquid Crystal Display Device 41>

A polarizing plate on the viewer's side was peeled off from a liquid crystal cell of iPad (a model with a photo-aligned film, from Apple Inc.), and the resultant cell was used as an IPS-mode liquid crystal cell with photo-aligned film. The liquid crystal cell was found to have a pre-tilt angle of 0°. Next, in place of the peeled-off polarizing plate, the above-manufactured polarizing plate 41 with the laminated optical film was bonded to the liquid crystal cell, to thereby manufacture an IPS liquid crystal display device of Example 41. In the process of bonding, the absorption axis of the polarizing plate was aligned normal to the optical axis of a liquid crystal layer in the liquid crystal cell, when observed in the direction normal to the substrate of the liquid crystal.

Example 42

Also in Examples 42 to 47, and Comparative Examples 61 and 62, bonding with the positive C-plate, manufacture of the polarizing plate, and manufacture of the IPS liquid crystal display device were implemented in the same way as Example 41, except that the optically anisotropic layer was changed to the optically anisotropic layers of Examples 22 to 27, and Comparative Examples 41 and 42.

Also display performances of the IPS liquid crystal display devices manufactured in Examples 41 to 47 and Comparative Examples 61 and 62 were measured using a commercially available software EZCom (from ELDIM) for analyzing viewing angle and chromaticity of liquid crystal. Back light was a commercially available one incorporated in a liquid crystal display unit of iPad (a model with a photo-aligned film, from Apple Inc.). Results are summarized in Table 7 below.

where, Ar represents a divalent aromatic ring group represented by the formulae (II-1), (II-2), (II-3) or (II-4) below;

each of $D^1$ and $D^2$ independently represents —CO—O—, —O—CO—, —C(=S)O—, —O—C(=OS)—, —$CR_1R_2$—, —$CR_1R_2$—$CR_3R_4$—, —O—$CR_1R_2$—O—, —$CR_1R_2$—O—$CR_3R_4$—, —$CR_1R_2$—O—CO—, —O—CO—$CR_1R_2$—, —$CR_1R_2$—O—CO—$CR_3R_4$—, —$CR_1R_2$—CO—O—$CR_3R_4$—, —$NR_1$—$CR_2R_3$—, —$CR_1R_2$—$NR_3$—, —CO—$NR_2$—, or —$NR_1$—CO—; each of $R_1$, $R_2$, $R_3$ and $R_4$ independently represents a hydrogen atom, halogen atom, or $C_{1-4}$ alkyl group;

each of $G^1$ and $G^2$ independently represents a $C_{5-8}$ divalent alicyclic hydrocarbon group, a methylene group contained in the alicyclic hydrocarbon group may be substituted by —O—, —S—, —NH— or —N(R)—;

each of $L^1$ and $L^2$ independently represents a monovalent organic group, and at least one selected from the group consisting of $L^1$ and $L^2$ represents a monovalent group having a polymerizable group,

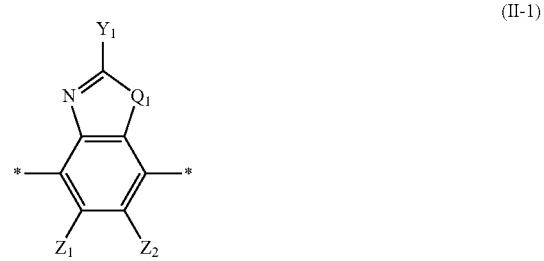

(II-1)

TABLE 7

| | Thickness (μm) | Average tilt angle | Re (nm) | Re (550)/d | Re (450/550) | Re (650/550) | Amount of residual monomer | X-ray diffraction pattern | Contrast of film | Contrast of panel | Leakage of light in oblique view | Viewing angle dependence of hue |
|---|---|---|---|---|---|---|---|---|---|---|---|---|
| Example 41 | 2.0 | 0° | 130 | 0.065 | 0.80 | 1.05 | <3% | Yes | 140,000 | A | A | A |
| Example 42 | 2.1 | 0° | 138 | 0.065 | 0.80 | 1.05 | <3% | No | 50,000 | B | A | A |
| Example 43 | 2.0 | 5° | 130 | 0.065 | 0.80 | 1.05 | <3% | Yes | 120,000 | A | B | B |
| Example 44 | 2.0 | 0° | 130 | 0.065 | 1.00 | 0.99 | <3% | Yes | 140,000 | A | A | A |
| Example 45 | 2.0 | 0° | 130 | 0.65 | 0.81 | 1.03 | <3% | Yes | 120,000 | A | A | A |
| Example 46 | 2.8 | 0° | 140 | 0.050 | 0.90 | 1.00 | <3% | Yes | 140,000 | A | A | A |
| Example 47 | 2.8 | 0° | 140 | 0.050 | 0.90 | 1.00 | <3% | Yes | 50,000 | B | A | A |
| Comparative Example 61 | 2.0 | 12° | 110 | 0.055 | 1.00 | 0.99 | <3% | Yes | 7,000 | C | C | C |
| Comparative Example 62 | 2.0 | 14° | 108 | 0.054 | 0.81 | 1.03 | <3% | Yes | 5,000 | C | C | B |

What is claimed is:

1. An optically anisotropic layer wherein a polymerizable composition, containing one or more polymerizable rod-like liquid crystal compound showing a smectic phase, is fixed in a state of smectic phase, and a direction of maximum refractive index of said optically anisotropic layer is inclined at 10° or smaller to the surface of said optically anisotropic layer, wherein the polymerizable rod-like liquid crystal compound is a compound represented by the formula (II);

$L^1$-$G^1$-$D^1$-Ar-$D^2$-$G^2$-$L^2$    Formula (II):

-continued

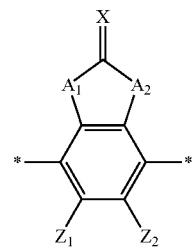

(II-2)

-continued

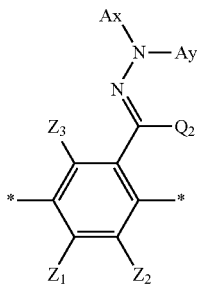
(II-3)

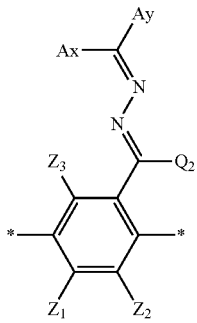
(II-4)

in the formula (II-1), $Q_1$ represents —S—, —O— or —$NR^{11}$—, where $R^{11}$ represents a hydrogen atom or $C_{1-6}$ alkyl group;

$Y_1$ represents a $C_{6-12}$ aromatic hydrocarbon group, or, $C_{3-12}$ aromatic heterocyclic group;

each of $Z_1$ and $Z_2$ independently represents a hydrogen atom or $C_{1-20}$ aliphatic hydrocarbon group, $C_{3-20}$ alicyclic hydrocarbon group, monovalent $C_{6-20}$ aromatic hydrocarbon group, halogen atom, cyano group, nitro group, —$NR^{12}R^{13}$ or —$SR^{12}$, $Z_1$ and $Z_2$ may combine with each other to form an aromatic ring or aromatic heterocycle, each of $R^{12}$ and $R^{13}$ independently represents a hydrogen atom or $C_{1-6}$ alkyl group;

in the formula (II-2), each of $A_1$ and $A_2$ independently represents a group selected from the group consisting of —O—, —NR—, —S— and —CO—, where R represents a hydrogen atom or substituent;

X represents a Group-XIV to XVI nonmetal atom, where, X may have a hydrogen atom or substituent bound thereto, and each of $Z_1$ and $Z_2$ independently represents a substituent;

in the formula (II-3) and the formula (II-4), Ax represents an $C_{2-30}$ organic group having at least one aromatic ring selected from the group consisting of aromatic hydrocarbon ring and aromatic heterocycle, Ay represents a hydrogen atom, a $C_{1-6}$ alkyl group which may have a substituent, or, a $C_{2-30}$ organic group having at least one aromatic ring selected from the group consisting of aromatic hydrocarbon ring and aromatic heterocycle; the aromatic ring contained in Ax and Ay may have a substituent; Ax and Ay may combine together to form a ring;

each of $Z_1$, $Z_2$ and $Z_3$ independently represents a hydrogen atom or substituent; and $Q_2$ represents a hydrogen atom, or, $C_{1-6}$ alkyl group which may have a substituent, and wherein the polymerizable composition comprises two or more different polymerizable rod-like liquid crystal compounds represented by the formula (II).

2. The optically anisotropic layer of claim 1, wherein the optically anisotropic layer has a thickness d of 1000 to 5000 nm, Re(550) of 10 to 400 nm, Re(550)/d of 0.01 to 0.1 where both of d and Re(550) are given in nm, and a contrast of 100,000 or larger and 200,000 or smaller.

3. The optically anisotropic layer of claim 1, wherein a ratio of the polymerizable rod-like liquid crystal compound which remains unpolymerized is 5% by mass or less.

4. The optically anisotropic layer of claim 1, wherein the polymerizable rod-like liquid crystal compound has a molecular weight of 1300 or smaller.

5. The optically anisotropic layer of claim 1, wherein the direction of maximum refractive index of the optically anisotropic layer is inclined at 0° or larger and 3° or smaller to the surface of the optically anisotropic layer.

6. A method of manufacturing the optically anisotropic layer of claim 1, which comprises steps of heating a layer which is provided on a support and is composed of a polymerizable composition which contains a polymerizable rod-like liquid crystal compound, up to or above the phase transition temperature between the smectic liquid crystal phase and the nematic liquid crystal phase, and cooling the layer to a temperature 5° C. or more lower than the phase transition temperature, followed by polymerization.

7. An organic EL display device comprising the optically anisotropic layer of claim 1.

8. The optically anisotropic layer of claim 1, wherein the polymerizable rod-like liquid crystal compound is a compound represented by the formula (I):

$$Q^1\text{-}SP^1\text{—}X^1\text{-}M^1\text{-}(Y^1\text{-}L\text{-}Y^2\text{-}M^2)_n\text{-}X^2\text{—}SP^2\text{-}Q^2 \quad \text{Formula (I):}$$

where, n is an integer representing the number of repetition of ($Y^1$-L-$Y^2$-$M^2$) which is 0 or more, each of $Q^1$ and $Q^2$ represents a polymerizable group, each of $SP^1$ and $SP^2$ represents a straight-chain or branched alkylene group, or a group composed of a combination of straight-chain or branched alkylene, with at least either of —O— and —C(=O)—, having 2 to 8 carbon atoms in total;

each of $X^1$ and $X^2$ represents a single bond or oxygen atom;

—$Y^1$-L-$Y^2$— represents a straight-chain alkylene group, or, a group composed of a combination of straight-chain alkylene group with —O— and/or —C(=O)—, having 3 to 18 carbon atoms in total;

$M^1$ is a group represented by

—$Ar^1$—COO—$Ar^2$—COO—$Ar^3$—COO— or

—$Ar^1$—COO—$Ar^2$—COO—$Ar^3$— or

—$Ar^1$—COO—$Ar^2$—$Ar^3$—;

$M^2$ is a group represented by

—$Ar^3$—OCO—$Ar^2$—OCO—$Ar^1$—OCO— or

—$Ar^3$—OCO—$Ar^2$—OCO—$Ar^1$— or

—$Ar^3$—OCO—$Ar^2$—$Ar^1$—; and each of $Ar^1$, $Ar^2$ and $Ar^3$ independently represents phenylene or biphenylene.

9. The optically anisotropic layer of claim 8, wherein the polymerizable rod-like liquid crystal compound represented by the formula (1) satisfies at least any one of a to c below:

a: At least either one of $Q^1$ and $Q^2$ represents a ring-opening polymerizable group,
b: Each of $SP^1$ and $SP^2$ contains an alkylene oxide unit,
c: n is 1 or larger.

10. The optically anisotropic layer of claim 1, wherein a polymerizable composition, containing two or more polymerizable rod-like liquid crystal compounds represented by the formula (II), is fixed, and a transition temperature from the smectic phase to the nematic phase of the composition is 80° C. or lower.

11. The optically anisotropic layer of claim 10, wherein a polymerizable composition, containing one or more polymerizable rod-like liquid crystal compound, is fixed in a state of nematic phase, and a direction of maximum refractive index of said optically anisotropic layer is inclined at 10° or smaller to the surface of the optically anisotropic layer.

12. The optically anisotropic layer of claim 1, wherein the polymerizable composition further contains 1% by mass or more and 50% by mass or less of a polymerizable rod-like compound represented by the formula (2);

$$Q^3\text{-}SP^3\text{—}X^3\text{-}M^3\text{-}(Y^3\text{-}L\text{-}Y^4\text{-}M^4)_m\text{-}X^4\text{—}SP^4\text{-}Q^4 \quad \text{Formula (2):}$$

where, m is an integer representing the number of repetition of $(Y^3\text{-}L\text{-}Y^4\text{-}M^4)$ which is 0 or more,
each of $Q^3$ and $Q^4$ represents a polymerizable group,
$SP^3$ and $SP^4$ represent a same group which is a straight-chain or branched alkylene group, or, a group composed of a combination of a straight-chain or branched alkylene group, with —O— and/or —C(=O)—, having 2 to 8 carbon atoms in total;
$X^3$ and $X^4$ represent a same group which is a single bond or oxygen atom;
—$Y^3$-L-$Y^4$— represents a straight-chain alkylene group, or, a group composed of a combination of straight-chain alkylene group with —O— and/or —C(=O)—, having 3 to 18 carbon atoms in total; and
each of $M^3$ and $M^4$ represents a group composed of two or more aromatic rings, and —O— and/or —C(=O)—.

13. The optically anisotropic layer of claim 12, wherein the polymerizable rod-like compound represented by the formula (2) satisfies at least any one of a to c below:
a: at least either one of $Q^3$ and $Q^4$ represents a ring-opening polymerizable group,
b: each of $SP^3$ and $SP^4$ contains an alkylene oxide unit,
c: m is 1 or larger.

14. The optically anisotropic layer of claim 13, wherein the polymerizable composition further contains a non-liquid crystalline multifunctional polymerizable compound.

15. The optically anisotropic layer of claim 1, which is a uniaxial birefringence layer having the slow axis in the in-plane direction.

16. The optically anisotropic layer of claim 15, wherein retardation values Re(450), Re(550) and Re(650) measured at 450 nm, 550 nm and 650 nm respectively satisfy the formulae (1) to (3):

$$100 \leq Re(550) \leq 180 \text{ nm} \quad \text{Formula (1)}$$

$$0.70 \leq Re(450)/Re(550) \leq 1.00 \quad \text{Formula (2)}$$

$$0.99 \leq Re(650)/Re(550) \leq 1.30. \quad \text{Formula (3)}$$

17. A laminate comprising the optically anisotropic layer of claim 1.

18. The laminate of claim 17, wherein the optically anisotropic layer of claim 1 is formed on the surface of a photo-aligned film.

19. The laminate of claim 18 which further comprises a linear polarizer, wherein the photo-aligned film is provided over the surface of the linear polarizer.

20. The laminate of claim 17, wherein the optically anisotropic layer of claim 1 is formed on the surface of a rubbed alignment film.

21. The laminate of claim 20, wherein the polymerizable rod-like liquid crystal compound has a longitudinal molecular axis orthogonal to the direction of rubbing of the rubbed alignment film.

22. The laminate of claim 20 which further comprises a linear polarizer, wherein the rubbed alignment film is provided on the surface of the linear polarizer.

23. The laminate of claim 17, wherein a uniaxial birefringence layer having a refractive index in the thickness direction larger than the refractive index in the in-plane direction is formed on the surface of the optically anisotropic layer of claim 1.

24. The laminate of claim 23, wherein the birefringence layer has a retardation Rth(550) measured at 550 nm in the thickness direction which satisfies the formula (4):

$$-180 \leq Rth(550) \leq -10. \quad \text{Formula (4)}$$

25. The laminate of claim 24, wherein the birefringence layer satisfies the formulae (1) and (2);

$$0.70 \leq Rth(450)/Rth(550) \leq 1.00 \quad \text{Formula (1)}$$

$$0.99 \leq Rth(650)/Rth(550) \leq 1.30, \quad \text{Formula (2)}$$

wherein Rth(450), Rth(550) and Rth(650) represent thickness retardation values measured at 450 nm, 550 nm and 650 nm, respectively.

26. A method of manufacturing the laminate of claim 23, which comprises:
step A of coating a photo-alignable material on a support to manufacture a photo-aligned film;
step B of vertically or obliquely irradiating polarized light to the photo-aligned film, as process B;
step C of coating a polymerizable composition which contains a polymerizable rod-like liquid crystal compound on the photo-aligned film after steps A and B; and
step D of heating the polymerizable composition up to or above a phase transition temperature between a smectic liquid crystal phase and a nematic liquid crystal phase, and cooling the composition to a temperature 5° C. or more lower than the phase transition temperature, followed by polymerization.

27. A method of manufacturing the laminate of claim 23, which comprises:
step A of coating a photo-alignable material on a support to manufacture a photo-aligned film;
step B of obliquely irradiating non-polarized light to the photo-aligned film, as process B;
step C of coating a polymerizable composition which contains a polymerizable rod-like liquid crystal compound on the photo-aligned film after steps A and B; and
step D of heating the polymerizable composition up to or above a phase transition temperature between a smectic liquid crystal phase and a nematic liquid crystal phase, and cooling the composition to a temperature 5° C. or more lower than the phase transition temperature, followed by polymerization.

28. A polarizing plate comprising the optically anisotropic layer of claim 1.

29. The polarizing plate of claim 28, wherein the slow axis of the optically anisotropic layer and the absorption axis of the linear polarizer form an angle of 45° to 90°.

30. A liquid crystal display device comprising the optically anisotropic layer of claim 1.

31. The liquid crystal display device of claim 30, which is an IPS-mode device.

32. The liquid crystal display device of claim 31, which is an IPS-mode device using a photo-alignment.

33. The liquid crystal display device of claim 32, wherein the rod-like liquid crystal used in a liquid crystal cell is aligned at an angle of 1° or smaller to the plane of the optically anisotropic layer.

\* \* \* \* \*